US009807308B2

(12) United States Patent
Dietel et al.

(10) Patent No.: US 9,807,308 B2
(45) Date of Patent: Oct. 31, 2017

(54) PERSONAL CAMERA COMPANION FOR REAL-TIME STREAMING

(71) Applicant: Verizon Patent and Licensing Inc., Arlington, VA (US)

(72) Inventors: Jeffrey Dietel, Clifton, NJ (US); Brian Scott Rowley, Providence, RI (US); Matthew Scott Deatrick, Oak Ridge, NJ (US); Denise Nicole Lyn-Shue, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 14/739,208

(22) Filed: Jun. 15, 2015

(65) Prior Publication Data

US 2016/0212327 A1 Jul. 21, 2016

Related U.S. Application Data

(60) Provisional application No. 62/105,126, filed on Jan. 19, 2015, provisional application No. 62/150,894, filed on Apr. 22, 2015.

(51) Int. Cl.
*H04N 5/232* (2006.01)
*H04N 1/00* (2006.01)
(Continued)

(52) U.S. Cl.
CPC ..... *H04N 5/23293* (2013.01); *H04N 1/00403* (2013.01); *H04N 5/23206* (2013.01);
(Continued)

(58) Field of Classification Search
CPC ........... H04N 5/23216; H04N 5/23293; H04N 5/232; H04N 5/23206; H04N 21/2187;
(Continued)

(56) References Cited

U.S. PATENT DOCUMENTS 6,428,449 B1 * 8/2002 Apseloff ................ A63B 24/00
482/3
8,628,421 B2 * 1/2014 Kert ........................ A63F 13/12
463/42

(Continued)

*Primary Examiner* — Twyler Haskins
*Assistant Examiner* — Akshay Trehan

(57) ABSTRACT

A device may display content being captured by a personal camera associated with a user. The device may receive an indication to stream the content based on a user interaction with the device. The device may determine configuration information associated with streaming the content. The configuration information including information that identifies a streaming application associated with streaming the content, and information that identifies a social media application associated with the user. The device may provide, via the social media application, a notification that the content is to be streamed via the streaming application. The notification may be provided for viewing by a viewer associated with the social media application. The device may stream the content using the streaming application. The content may be streamed to allow the viewer to access the content via the streaming application and in real-time or near real-time relative to the capturing of the content.

20 Claims, 20 Drawing Sheets

(51) Int. Cl.
  *H04N 21/2187* (2011.01)
  *H04N 21/4788* (2011.01)
  *H04N 21/414* (2011.01)
  *H04N 21/422* (2011.01)
  *H04N 21/437* (2011.01)
  *H04N 21/81* (2011.01)

(52) U.S. Cl.
  CPC ..... *H04N 5/23216* (2013.01); *H04N 21/2187* (2013.01); *H04N 1/00209* (2013.01); *H04N 5/23245* (2013.01); *H04N 21/41407* (2013.01); *H04N 21/422* (2013.01); *H04N 21/437* (2013.01); *H04N 21/4788* (2013.01); *H04N 21/8173* (2013.01)

(58) Field of Classification Search
  CPC ........... H04N 21/4788; H04N 1/00403; H04N 5/23203
  See application file for complete search history.

(56) References Cited

U.S. PATENT DOCUMENTS

| | | | | |
|---|---|---|---|---|
| 8,893,010 B1* | 11/2014 | Brin | ................ | H04L 29/06476 715/738 |
| 2005/0118990 A1* | 6/2005 | Stephens | ........... | H04M 1/72555 455/418 |
| 2006/0197860 A1* | 9/2006 | Kim | ................... | H04N 1/00307 348/333.1 |
| 2009/0189981 A1* | 7/2009 | Siann | ..................... | H04N 7/183 348/143 |
| 2010/0060747 A1* | 3/2010 | Woodman | .............. | G03B 17/02 348/222.1 |
| 2012/0004956 A1* | 1/2012 | Huston | .............. | G06Q 30/0207 705/14.1 |
| 2012/0296972 A1* | 11/2012 | Backer | ................... | H04L 65/60 709/204 |
| 2013/0033610 A1* | 2/2013 | Osborn | ................ | H04N 5/2258 348/207.1 |
| 2014/0160316 A1* | 6/2014 | Hwang | ............. | G06F 17/30268 348/231.99 |
| 2014/0204245 A1* | 7/2014 | Wexler | ............... | H04N 5/23222 348/231.99 |
| 2015/0147048 A1* | 5/2015 | Kim | ................... | H04N 21/4852 386/282 |
| 2015/0195442 A1* | 7/2015 | Pacurariu | ........... | H04N 5/23203 348/211.2 |

* cited by examiner

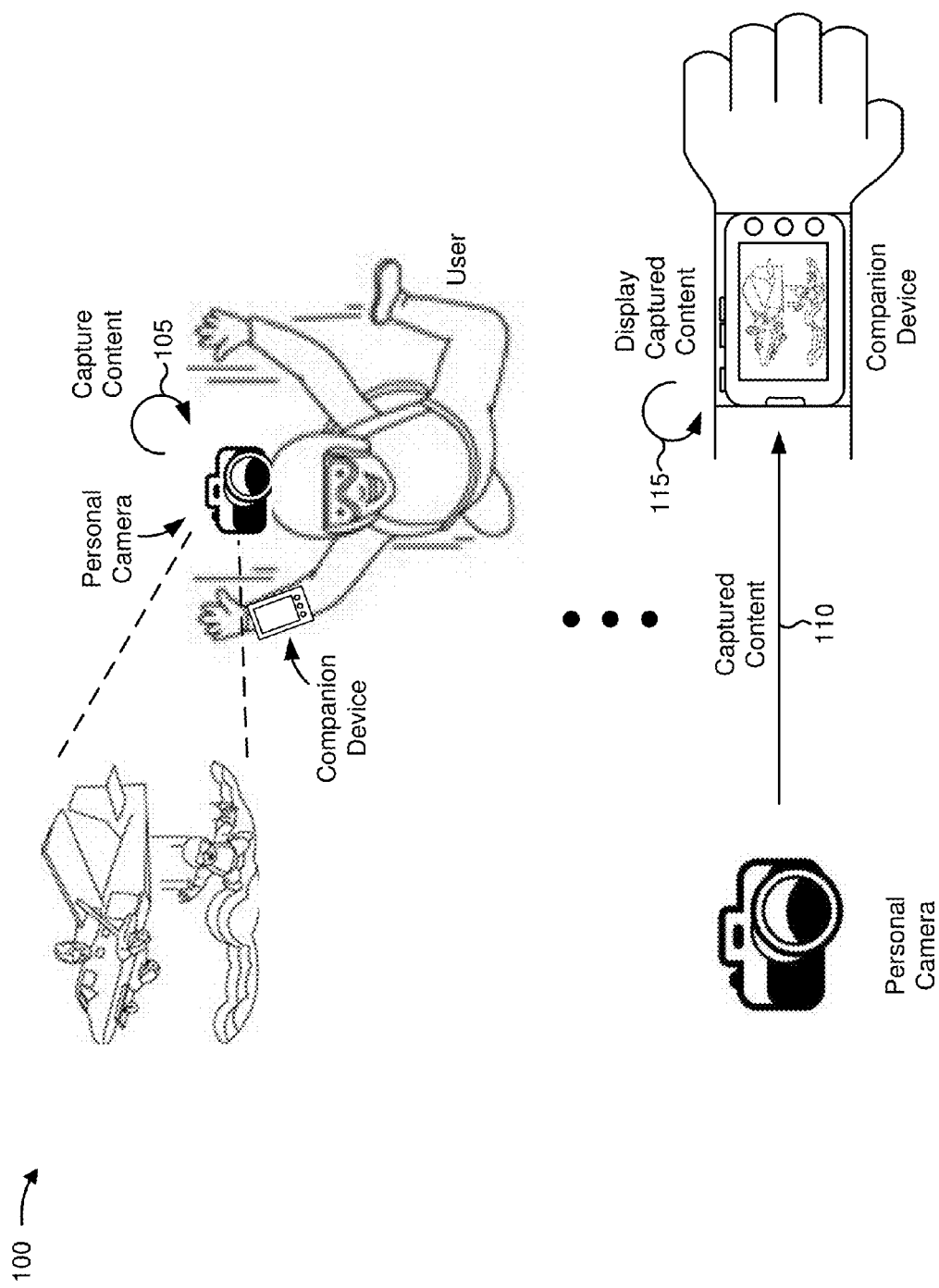

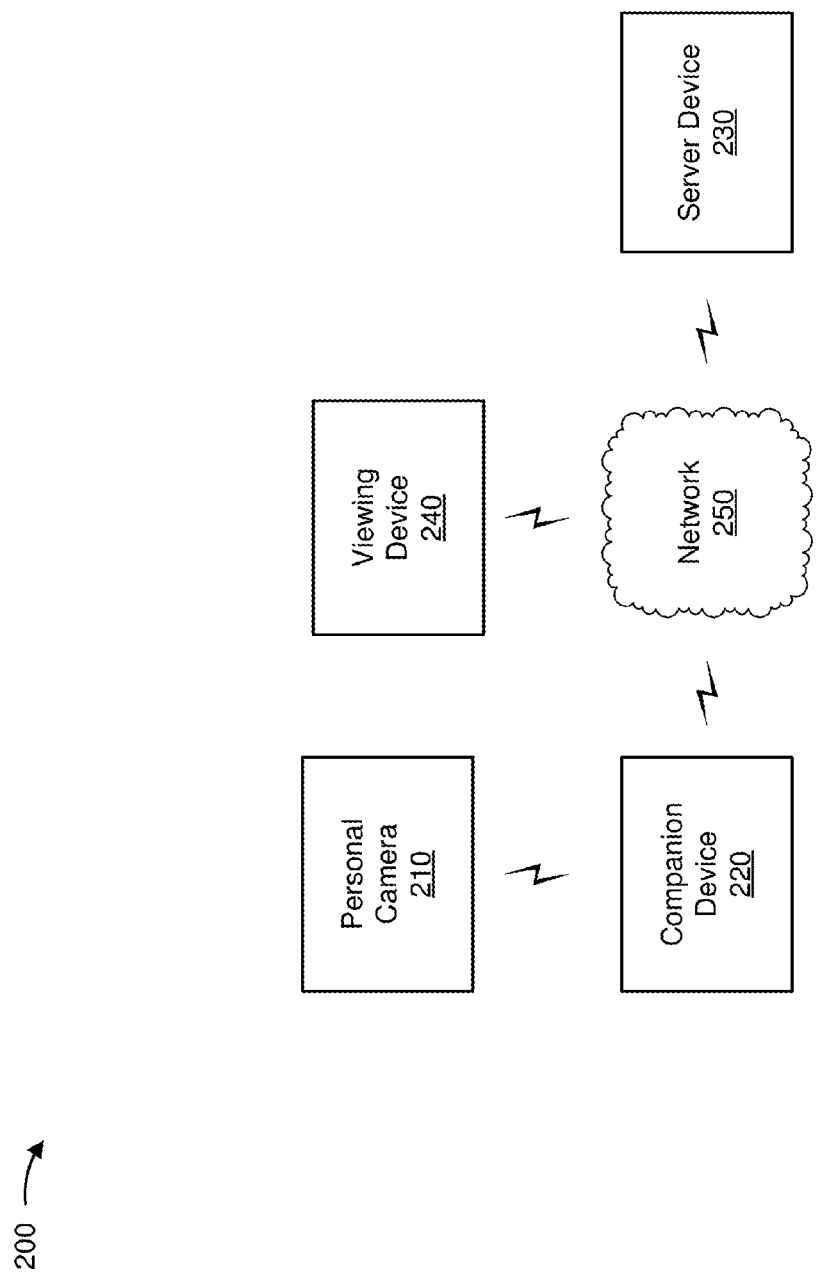

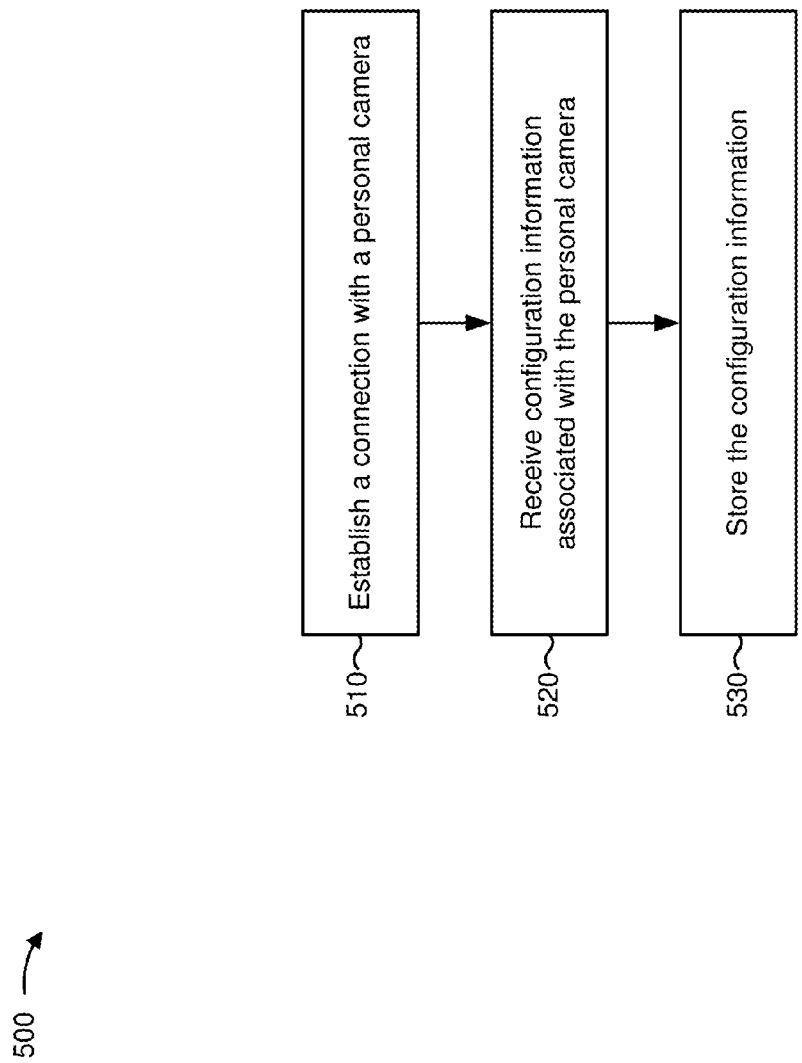

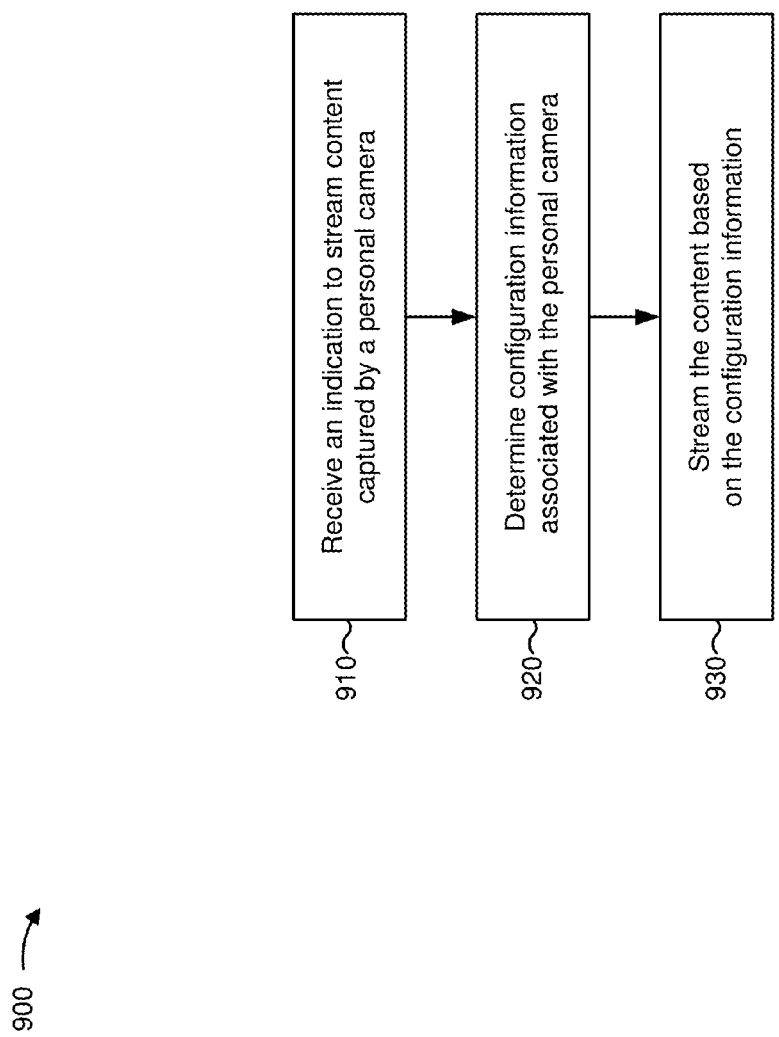

PERSONAL CAMERA COMPANION FOR REAL-TIME STREAMING

RELATED APPLICATIONS

This application claims priority under 35 U.S.C. §119 to U.S. Provisional Patent Application No. 62/105,126, filed on Jan. 19, 2015, the content of which is incorporated by reference herein in its entirety.

This application also claims priority under 35 U.S.C. §119 to U.S. Provisional Patent Application No. 62/150,894, filed on Apr. 22, 2015, the content of which is incorporated by reference herein in its entirety.

BACKGROUND

A personal live image capture device (herein referred to as a personal camera) may include a camera device capable of capturing content (e.g., an image, a series of images, a video, audio, etc.). In some cases, the personal camera may be worn by a user (e.g., on a wrist, on a helmet, on a harness, etc.) and/or mounted on an object (e.g., a snowboard, a surfboard, a vehicle, etc.).

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 5 is a flow chart of an example process for receiving configuration information associated with a personal camera;

FIG. 9 is a flow chart of an example process for causing content, captured by a personal camera, to be streamed;

DETAILED DESCRIPTION OF PREFERRED EMBODIMENTS

The following detailed description of example implementations refers to the accompanying drawings. The same reference numbers in different drawings may identify the same or similar elements.

A user may wear and/or mount a personal camera (e.g., a GoPro personal camera) in order to capture content (e.g., an image, a series of images, a video, audio, etc.) associated with an activity (e.g., surfing, biking, rock climbing, etc.). Traditionally, the user may view, upload (e.g., to the Internet), and/or share (e.g., via social media) the content only at a later time (i.e., after the activity being captured is over).

Implementations described herein may allow a companion device to display, upload, share, and/or stream content, captured by a personal camera, while an activity is ongoing (e.g., in real-time, in near real-time, immediately after the content is captured, etc.). Implementations described herein may also allow the companion device to control the personal camera and/or the displaying, the uploading, the sharing, and/or the streaming of the content based on user input (e.g., touch input, voice input, etc.) provided via the companion device.

Figure 1B:
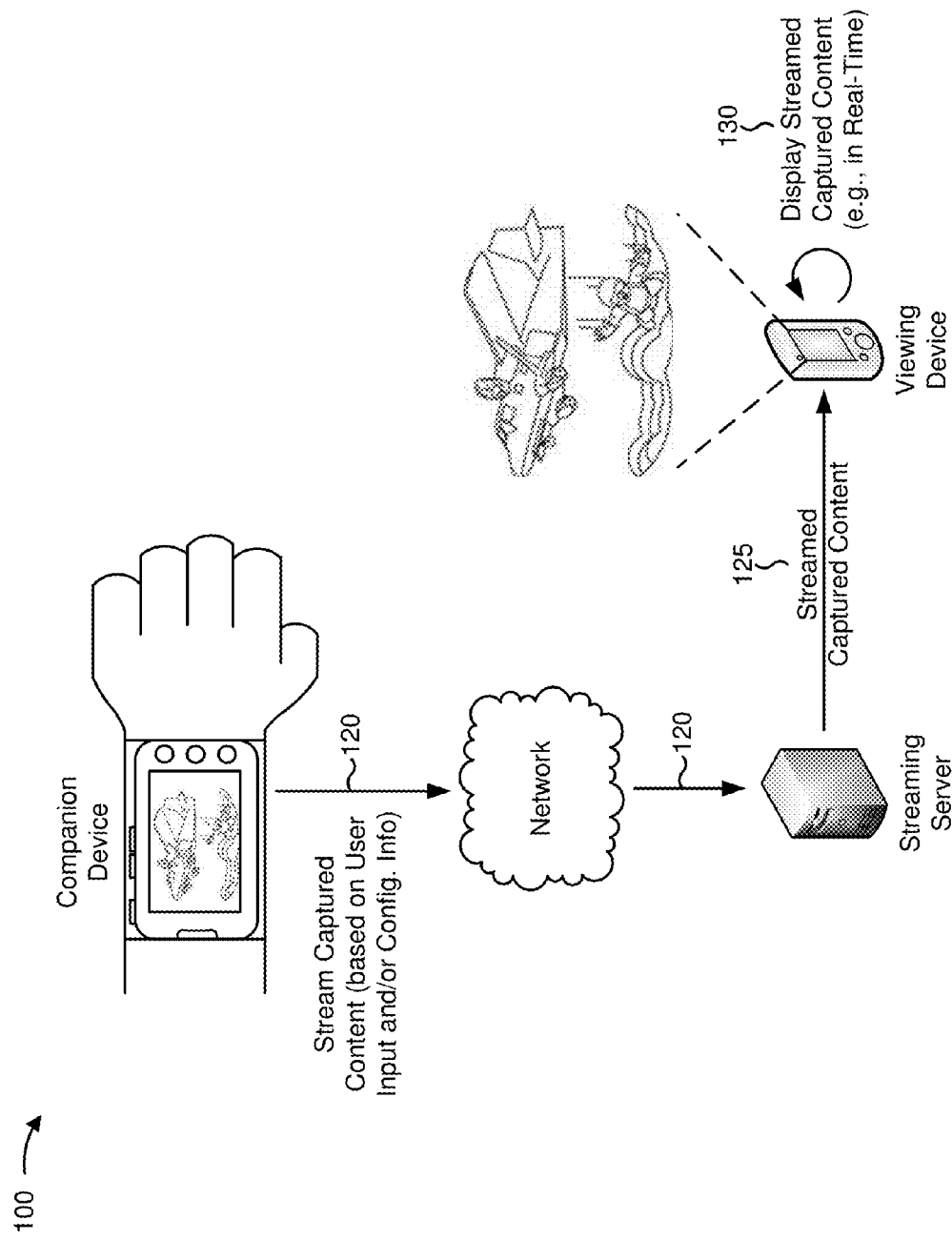

FIGS. 1A and 1B are diagrams of an overview of an example implementation 100 described herein. For the purposes of example implementation 100, assume that a companion device is capable of communicating (e.g., via Bluetooth, via WiFi, etc.) with a personal camera associated with a user.

As shown in the upper portion of FIG. 1A, in some implementations, the personal camera may be worn by the user on, for example, a wrist, a helmet, a harness, or the like. Additionally, or alternatively, the personal camera may be mounted elsewhere, such as a vehicle, a surfboard, a stationary object, or the like. As further shown, the companion device may also be worn by the user and/or may be located near the user (e.g., such that the user may view and/or interact with the companion device). As shown, assume that the user, while wearing the personal camera and the companion device, is participating in an activity.

As shown by reference number 105, the personal camera may capture content during the activity, such as an image, a series of images, a video, audio, or the like. In some implementations, the personal camera may capture the content based on an indication provided via the companion device. For example, the companion device may receive user input (e.g., touch input, voice input, etc.) indicating that the personal camera is to begin capturing the content, and may communicate with the personal camera to cause the personal camera to begin capturing the content, accordingly. In some implementations, the indication may be associated with recording a video, streaming a video, capturing an image, or the like.

As shown in the lower portion of FIG. 1A, and by reference number 110, the personal camera may provide the captured content to the companion device (e.g., in real-time, in near real-time, as the content is being captured, immediately after capturing the content, etc.). As shown by reference number 115, the companion device may receive the captured content, and may display the captured content via a display screen of the companion device.

For the purposes of FIG. 1B, assume that the companion device receives an indication that the captured content is to be provided for streaming. In other words, assume that the companion device receives an indication that the content is to be provided such that the content may be provided for display to a viewer (e.g., at a different location) in real-time, in near real-time, as the personal camera is capturing the content, or the like. In some implementations, the indication may be based on user input associated with causing the personal camera to capture content, as described above (e.g., when the user indicates that the personal camera is to capture the content for streaming). Additionally, or alternatively, the indication may be based on user input received by the companion device after the personal camera begins capturing the content (e.g., when the user indicates that the content is to be recorded, and then indicates that the content is to be streamed at a later time).

As shown by reference number 120, the companion device, upon receiving the indication, may stream the captured content to a server device associated with providing the streaming content for viewing in real-time, in near real-time, or the like. In some implementations, the companion device may stream the captured content via a wireless network, such as a Long Term Evolution (LTE) network, a LTE Advanced network, a third generation (3G) network, or another type of wireless network. As shown, the companion device may provide the captured content based on configuration information associated with the companion device. In some implementations, the configuration information may include information that indicates a manner in which the content is to be streamed. For example, the configuration information may include information that identifies a streaming application via which the captured content is to be streamed, login information for a user account associated with the streaming application, the server device, or the like.

Additionally, or alternatively, the configuration information may include information associated with a social media application (e.g., an application identifier, login information, a default message for posting to a user account associated with the user, etc.) via which the captured content and/or information associated with the captured content is to be shared, and the companion device may provide the captured content and/or information associated with the captured content accordingly (e.g., via the server device and/or another server device).

As shown by reference number 125, the server device may receive the captured content provided by the companion device, and may provide the captured content. As shown by reference number 130, a viewing device (e.g., with access to the streaming application and/or the server device), may provide the streamed captured content for display such that a viewer may view the captured content in real-time, in near real-time, as the content is being captured, immediately after the content is captured, or the like.

In this way, a companion device may display, upload, share, and/or stream content, captured by a personal camera, while an activity is ongoing (e.g., in real-time, in near real-time, as the content is being captured, immediately after the content is captured, etc.). Implementations described herein may also allow the companion device to control the personal camera and/or the displaying, the uploading, the sharing, and/or the streaming of the content based on user input (e.g., touch input, voice input, etc.), provided via the companion device.

FIG. 2 is a diagram of an example environment 200 in which systems and/or methods, described herein, may be implemented. As shown in FIG. 2, environment 200 may include a personal camera 210, a companion device 220, a server device 230, a viewing device 240, and a network 250. Devices of environment 200 may interconnect via wired connections, wireless connections, or a combination of wired and wireless connections.

Personal camera 210 may include a camera device capable of capturing, providing, and/or storing content. For example, personal camera 210 may include a GoPro personal camera or another type of personal camera. While this description may refer to a GoPro personal camera as an example of a personal camera 210, personal camera 210 may correspond to other types of personal cameras, such as personal cameras made by Sony, Garmin, Drift, or the like.

Companion device 220 may include a device capable of causing content, captured by personal camera 210, to be displayed, uploaded, shared, and/or streamed (e.g., in real-time relative to the capturing of the content, in near real-time relative to the capturing of the content, etc.) to one or more devices via network 250. For example, companion device 220 may include a device capable of streaming the content, via an LTE network, via a Wi-Fi network, etc., to one or more server devices 230 (e.g., such that the content may be viewed in real-time, in near real-time, etc. via one or more viewing devices 240).

In some implementations, companion device 220 may include a wearable device capable of wirelessly communicating with personal camera 210 (e.g., via a Bluetooth connection, via a WiFi network, etc.). In some implementations, companion device 220 may be capable of controlling (e.g., initiating recording, initiating streaming, powering-on, etc.) personal camera 210 based on user input (e.g., via a touch screen, based on voice input, etc.) received by companion device 220. Additionally, or alternatively, companion device 220 may be capable of displaying the content captured by personal camera 210.

Server device 230 may include one or more devices that receive content from companion device 220 and cause the content to be provided (e.g., displayed, uploaded, shared, streamed, etc.) to one or more other devices. For example, server device 230 may include a server device or a group of server devices. In some implementations, server device 230 may host a streaming application, a streaming video channel, a social media application, a website, or the like, associated with displaying, uploading, sharing, and/or streaming the content and/or information associated with the content.

Viewing device 240 may include a device capable of providing content for display to a viewer. For example, viewing device 240 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set top box, a smart television, or the like. In some implementations, viewing device 240 may have access to server device 230 that hosts a streaming application and/or a social media application via which the content is streamed and/or shared.

Network 250 may include one or more wired and/or wireless networks. For example, network 250 may include a LTE network, a public land mobile network ("PLMN"), a second generation ("2G") network, a third generation ("3G") network, a fourth generation ("4G") network, a fifth generation ("5G") network, and/or another network. Additionally, or alternatively, network 250 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
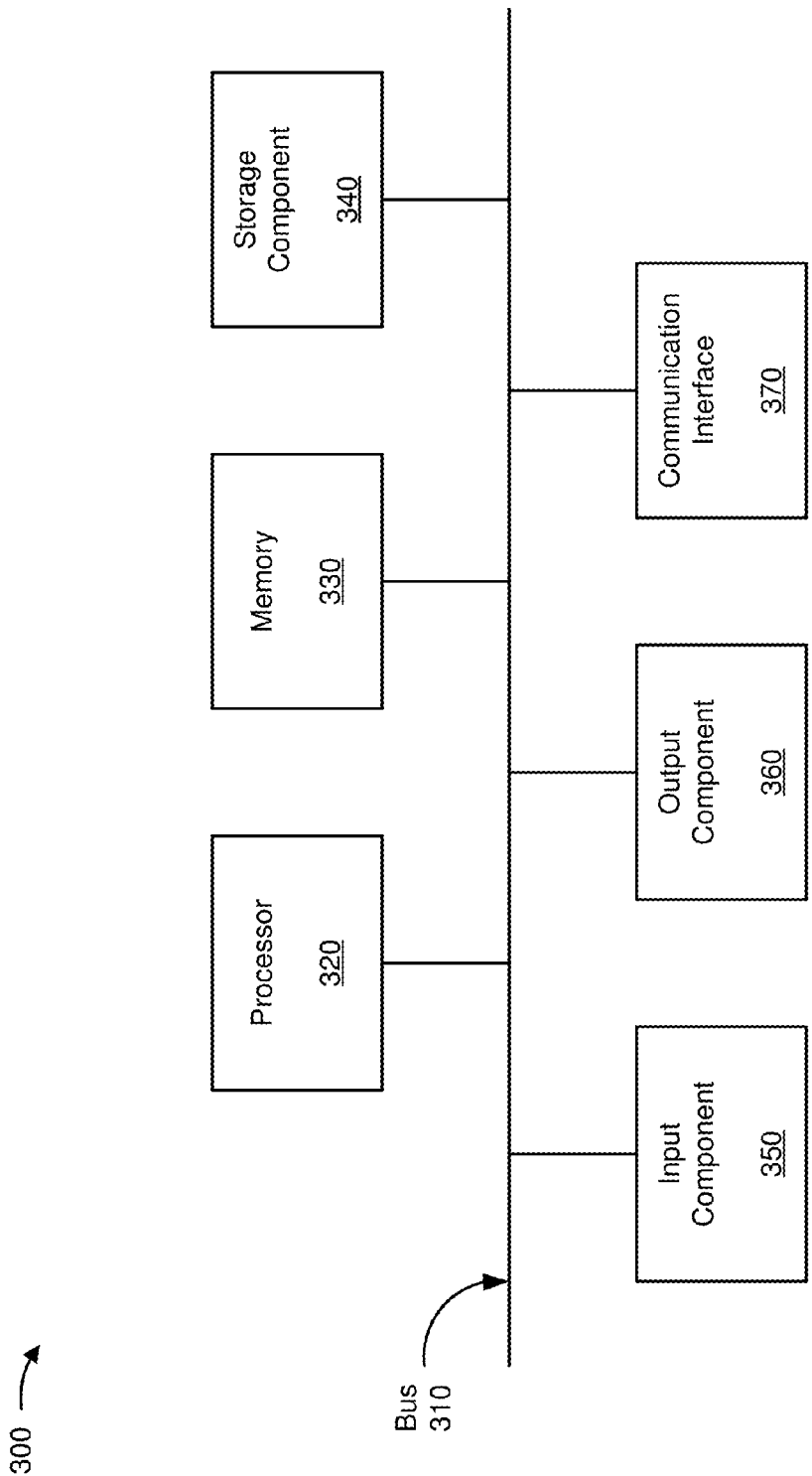
FIG. 3 is a diagram of example components of one or more devices of FIG. 2.

FIG. 3 is a diagram of example components of a device 300. Device 300 may correspond to personal camera 210, companion device 220, server device 230, and/or viewing device 240. In some implementations, personal camera 210, companion device 220, server device 230, and/or viewing device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
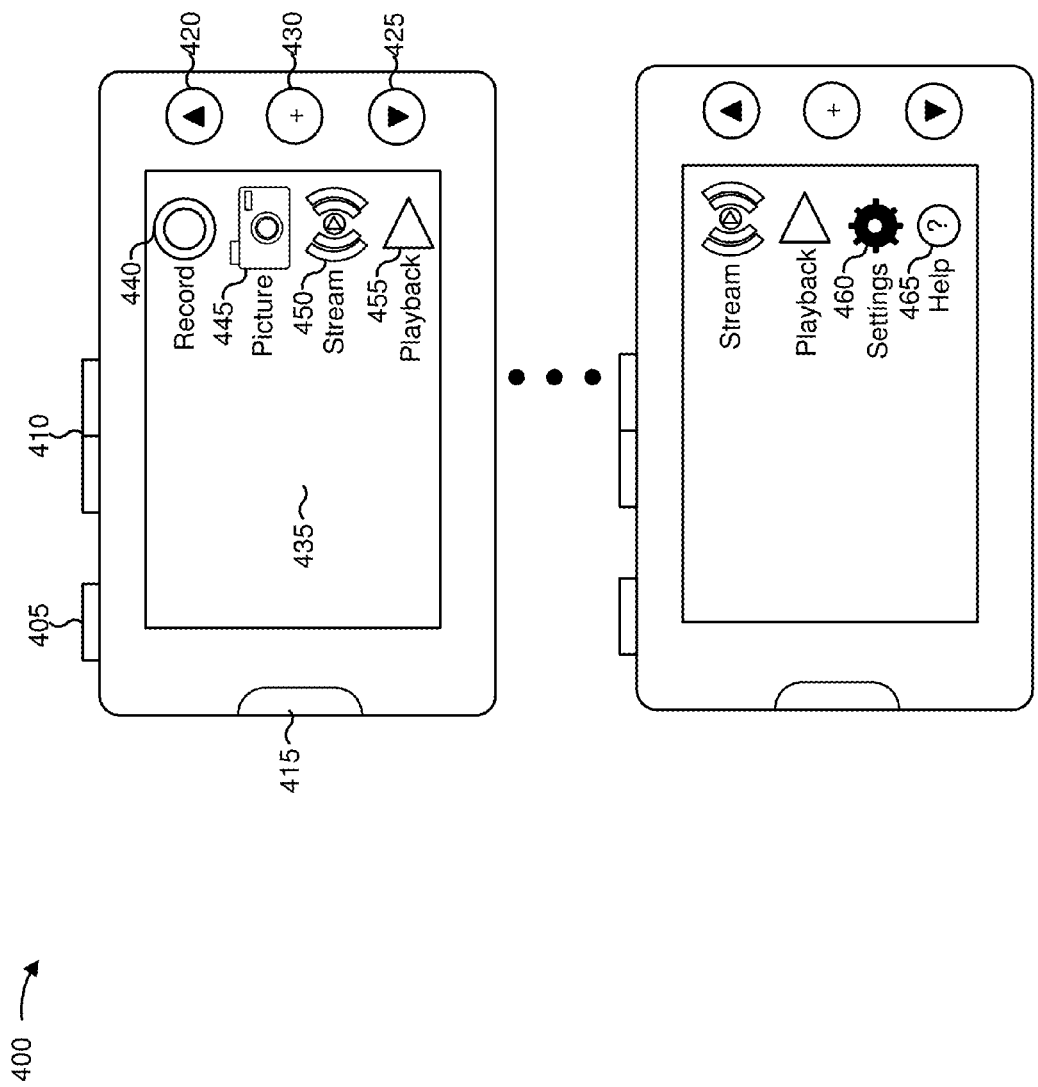
FIG. 4 is a diagram of an example configuration of input elements associated with a companion device.

FIG. 4 is a diagram of an example configuration 400 of input elements associated with companion device 220. In some implementations, companion device 220 may receive, via one or more input elements associated with companion device 220, user input associated with controlling and/or interacting with companion device 220 and/or causing content to be captured, displayed, uploaded, shared, and/or provided. For example, companion device 220 may receive user input via one or more physical input elements (e.g., one or more hard keys) of companion device 220, such as a button, a switch, a knob, or the like. As another example, companion device 220 may receive user input via one or more virtual input elements (e.g., displayed via touch screen 435) associated with companion device 220, such as a virtual button, a virtual switch, a virtual knob, a text box, a check box, a drop down menu, or the like.

As shown in FIG. 4, companion device 220 may include a set of physical input elements, such as power button 405 associated with powering companion device 220 on and off, and volume button 410 associated with adjusting a volume of speaker/microphone 415. As further shown, the set of physical input elements may also include an up button 420, a down button 425, and a select/shutter button 430 associated with navigating through and/or selecting virtual input elements, menu items, or the like, displayed via touch screen 435.

In some implementations, select/shutter button 430, when pressed, may cause an item displayed by touch screen 435 to be selected, such as a particular virtual input element highlighted on touch screen 435 based on user input provided via up button 420 and/or down button 425. Additionally, or alternatively, select/shutter button 430, when pressed (e.g., once, twice, etc.), may indicate the companion device 220 is to cause personal camera 210 to capture an image, record a video, stream a video, stream audio, or the like, as described in further detail below.

As further shown, companion device 220 may also display (e.g., via touch screen 435) a set of virtual input elements. For example, companion device 220 may display record button 440 associated with causing personal camera 210 to start or stop recording a video, picture button 445 associated with causing personal camera 210 to capture an image, stream button 450 associated with initiating and/or stopping streaming of the content by companion device 220, playback button 455 associated with viewing previously captured content, settings button 460 associated with configuring companion device 220 and/or personal camera 210, and/or help button 465 associated with providing instructions associated with operating companion device 220 and/or personal camera 210. In some implementations, companion device 220 may receive an indication that the user has selected a virtual input element via touch screen 435 (e.g., when the user selects a virtual input element by touching touch screen 435) and/or a press of select/shutter button 430 (e.g., when the user scrolls to the virtual input element using up button 420 and/or down button 425 and presses select/shutter button 430).

In some implementations, companion device 220 may display the virtual input elements based on a user interaction, such as when companion device 220 detects a user tap of touch screen 435 and/or when the user presses select/shutter button 430. Additionally, or alternatively, companion device 220 may be configured to stop displaying the virtual input elements. For example, the virtual input elements may disappear when companion device 220 does not receive user input for a threshold amount of time, such as two seconds, five seconds, one minute, or the like. Additionally, or alternatively, companion device 220 may be configured to constantly display the virtual input elements.

In some implementations, companion device 220 may display an indication that a virtual input element is highlighted for selection. For example, companion device 220 may receive, via up button 420 and/or down button 425, user input associated with scrolling through the virtual input elements (e.g., record button 440, picture button 445, stream button 450, playback button 455, settings button 460, help button 465, etc.) such that the user may select a particular virtual input element (e.g., by pressing select/shutter button 430). Here, companion device 220 (e.g., while scrolling through the virtual input elements) may display an indication that a virtual input element is highlighted for selection by changing a size of the virtual input element, by changing a color of and/or around the virtual input element, or the like.

Additionally, or alternatively, companion device 220 may alter which of the virtual input elements are displayed (e.g., based on user input, when personal camera 210 is capturing content, etc.). For example, when companion device 220 is in a wait mode (e.g., when companion device 220 displays a video feed view from personal camera 210, but companion device 220 is not uploading, sharing, and/or streaming any content) companion device 220 may display record button 440, picture button 445, stream button 450, and playback button 455, but may not display settings button 460 or help button 465. Here, companion device 220 may display settings button 460 and/or help button 465 when companion device 220 receives user input (e.g., via up button 420 and/or down button 425) indicating that companion device 220 is to display settings button 460 and/or help button 465 (e.g., when the user input indicates that companion device 220 is to scroll through the virtual input elements). Additional examples of companion device 220 altering the display of the virtual input elements are described below.

In some implementations, companion device 220 may be configured to display, via touch screen 435, a video feed from personal camera 210. In other words, touch screen 435 may display a real-time view from personal camera 210 (e.g., even when personal camera 210 is turned on, but is not recording content). Here, companion device 220 may display the virtual input elements on top of the video feed from personal camera 210, adjacent to the video feed from personal camera 210, or the like.

Additionally, or alternatively, companion device 220 may be configured to display a status bar via touch screen 435. For example, companion device 220 may display (e.g., in a top portion of touch screen 435, in a bottom portion of touch screen 435, etc.) information associated with companion device 220, such as remaining battery life of companion device 220, a signal status and/or strength associated with network 250, a signal status and/or strength associated with a connection with personal camera 210, a remaining battery life of personal camera 210, or the like. In some implementations, companion device 220 may display the status bar when companion device 220 powers-on, is in a wait mode, based on detecting a user interaction with touch screen 435, or the like. In some implementations, companion device 220 may display the status bar during an entire time that companion device 220 is in a powered-on state.

Additionally, or alternatively, companion device 220 may display the status bar for a period of time before (e.g., automatically) stopping the display of the status bar. For example, companion device 220 may display the status bar for a period of time such as three seconds after detecting a user interaction, ten seconds after companion device 220 powers-on, or the like, and companion device 220 may stop displaying the status bar after the period of time.

Additionally, or alternatively, companion device 220 may display the status bar to indicate an error and/or issue associated with companion device 220 and/or personal camera 210. For example, companion device 220 may automatically display the status bar when companion device 220 determines that a signal, associated with network 250 and/or personal camera 210, fails and/or is weak, when the remaining battery life of companion device 220 and/or personal camera 210 is at or below a threshold, or the like. In some implementations, companion device 220 may cause the status bar to blink and/or may also display a pop-up window associated with the error and/or issue (e.g., to warn the user of the error and/or issue).

In some implementations, companion device 220 may be configured with a tutorial associated with the physical input elements and/or the virtual input elements of companion device 220. For example, when companion device 220 powers on, establishes a connection with personal camera 210, or the like, companion device 220 may display a tutorial associated with guiding the user through completing one or more actions via the physical input elements and/or the virtual input elements of companion device 220.

FIG. 5 is a flow chart of an example process 500 for receiving configuration information associated with a personal camera. In some implementations, one or more process blocks of FIG. 5 may be performed by companion device 220.

As shown in FIG. 5, process 500 may include establishing a connection with a personal camera (block 510). For example, companion device 220 may establish a connection with personal camera 210. In some implementations, companion device 220 may establish the connection with personal camera 210 when companion device 220 receives an indication that companion device 220 is to establish the connection with personal camera 210, as described below.

Figure 6A:
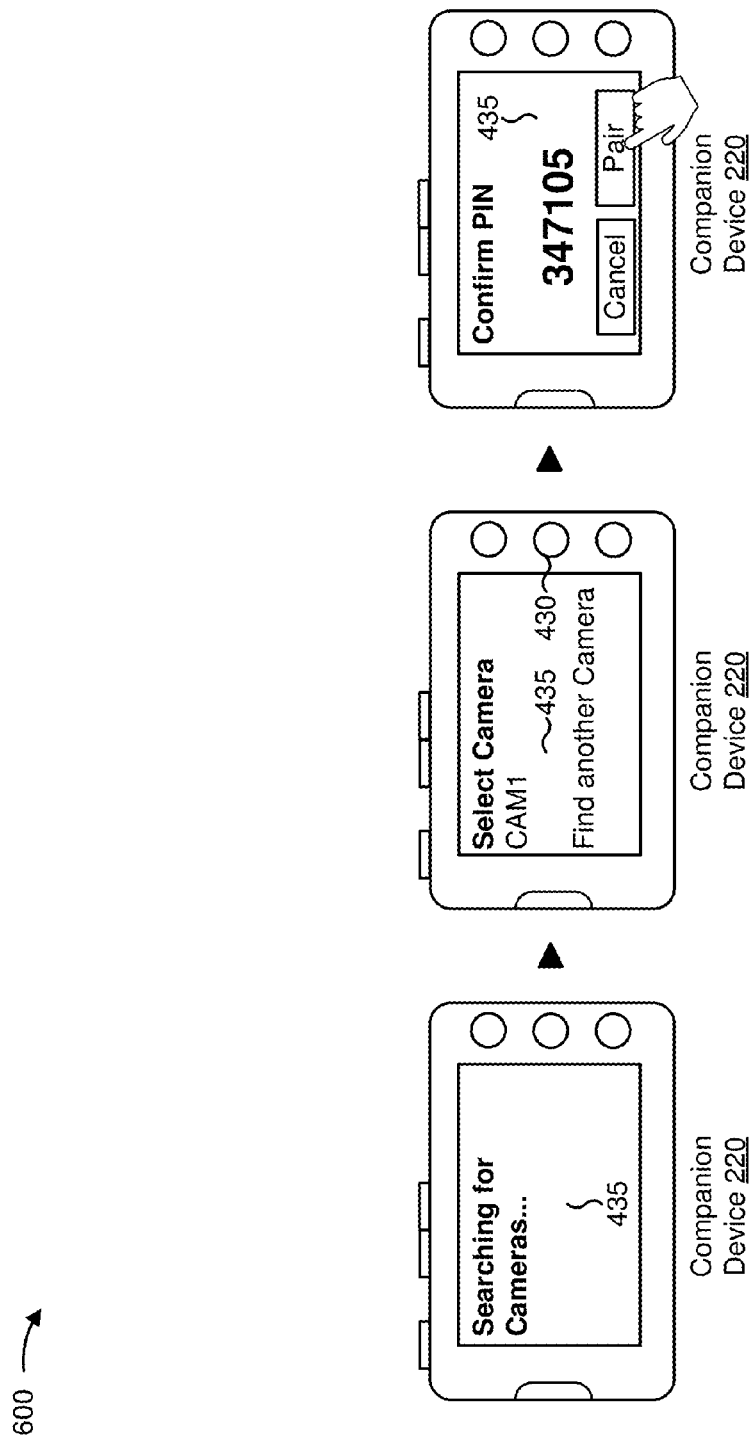
FIGS. 6A and 6B are diagrams of an example implementation of a companion device establishing a connection with a personal camera based on searching for the personal camera.
Figure 6B:
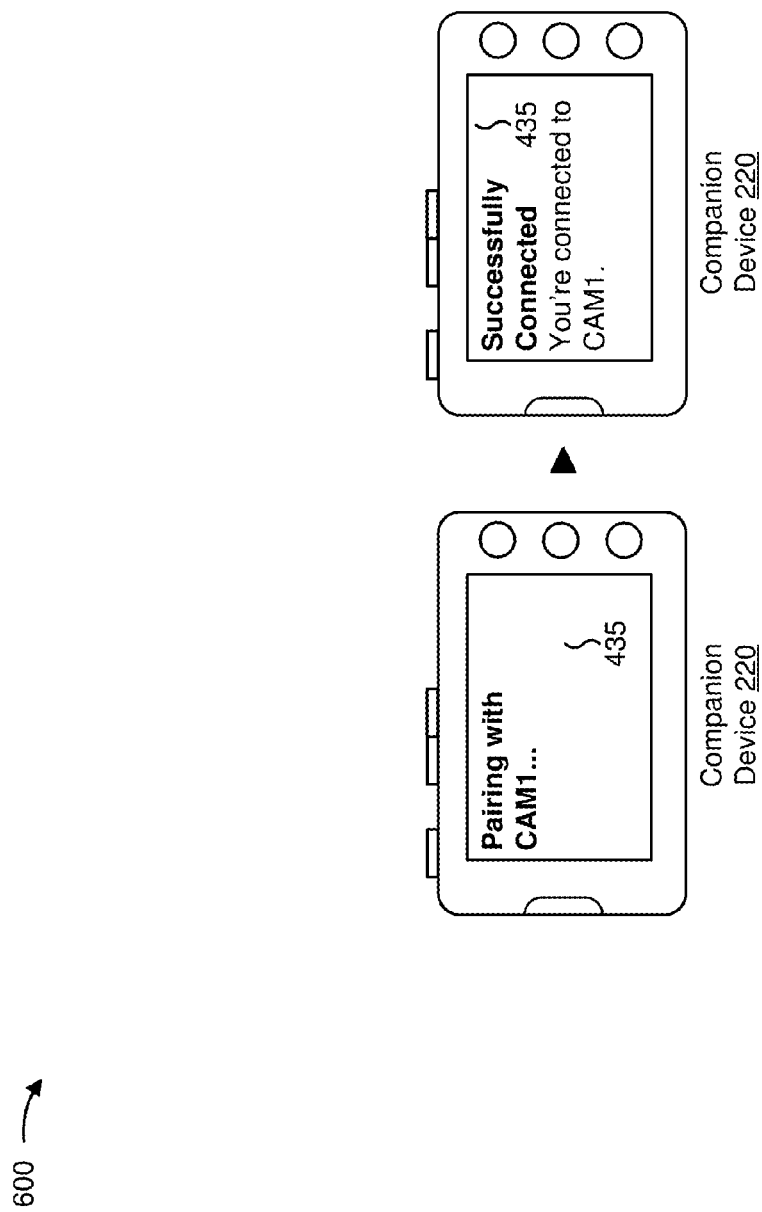

In some implementations, companion device 220 may establish a connection with personal camera 210 based on searching for personal camera 210. FIGS. 6A and 6B are diagrams of an example implementation 600 of companion device 220 establishing a connection with personal camera 210 based on searching for personal camera 210. For the purpose of example implementation 600, assume that companion device 220 receives an indication (e.g., based on user input, automatically after powering-on, etc.) that companion device 220 is to search for personal cameras 210 with which to establish a connection, such as a Bluetooth connection, a WiFi connection, or the like.

As shown in the left portion of FIG. 6A, companion device 220 may display, via touch screen 435, an indication that companion device 220 is searching for personal cameras 210 (e.g., "Searching for Cameras"). In some implementations, companion device 220 may be capable of detecting personal cameras 210 within a threshold distance of companion device 220, such as a threshold distance associated with establishing a Bluetooth connection, a WiFi connection, or the like.

As shown in the center portion of FIG. 6A, assume that companion device 220 detects personal camera 210 (e.g., called "CAM1") within the threshold distance of companion device 220. As shown, companion device 220 may display information that identifies personal camera CAM1, and may also display information associated with connecting to a different personal camera 210 (e.g., "Connect to Other Camera"). As such, companion device 220 may provide the user with an option to proceed with connecting to the detected personal camera 210 or repeating the search in order to detect different personal cameras 210. In this example, assume that companion device 220 receives user input (e.g., based on selecting CAM1 on touch screen 435, based on pressing select/shutter button 430, via voice input, etc.) indicating that companion device 220 is to establish a connection with personal camera CAM1.

In some implementations, companion device 220 may confirm that companion device 220 is to establish a connection with the detected personal camera 210. For example, personal camera 210 may display, via touch screen 435, a personal camera 210 identifier, such as a personal camera 210 name, a personal camera 210 number, a personal camera 210 PIN, or the like. Companion device 220 may confirm that companion device 220 is to establish the connection with the detected personal camera 210 after companion device 220 receives the personal camera 210 identifier. For example, as shown in the right portion of FIG. 6A, companion device 220 may receive, from personal camera CAM1, a PIN number associated with personal camera CAM1, and may display the PIN number to the user. Here, assume that personal camera CAM1 also displays the PIN number such that the user may view the PIN number on both personal camera CAM1 and companion device 220. In this example, the user may view the PIN numbers, may confirm that the PIN numbers match, and may indicate (e.g., by selecting a Pair button via touch screen 435), that companion device 220 is to establish the connection with personal camera CAM1. In a scenario in which the PIN numbers do not match (e.g., indicating that companion device 220 has detected a personal camera 210 not associated with the user), the user may indicate (e.g., by selecting a Cancel button via touch screen 435) that companion device 220 is to repeat searching for personal cameras 210.

In some implementations, companion device 220 may establish the connection with personal camera CAM1 after confirming that companion device 220 is to establish the connection. For example, as shown in the left portion of FIG. 6B, companion device 220 may pair with personal camera CAM1 (e.g., via Bluetooth). In some implementations, after establishing the connection with personal camera CAM1, companion device 220 may provide, for display via touch screen 435, an indication that companion device 220 is connected to personal camera CAM1. For example, as shown in the right portion of FIG. 6B, companion device 220 may provide, for display via touch screen 435, an indication that companion device 220 has successfully established a connection with personal camera CAM1 (e.g., "Successfully Connected. You're connected to CAM1").

In some implementations, companion device 220 may establish a Bluetooth connection with personal camera 210. Additionally, or alternatively, companion device 220 may establish a connection via a WiFi network associated with personal camera 210. For example, companion device 220 may receive (e.g., automatically, based on user input, etc.) information associated with connecting to a WiFi network associated with personal camera 210. Additionally, or alternatively, companion device 220 may establish another type of connection with personal camera 210.

In some implementations, companion device 220 may be unable to detect personal camera 210. For example, companion device 220 may be unable to detect personal camera 210 when personal camera 210 is not in a pairing mode associated with connecting to companion device 220. In this example, companion device 220 may provide, for display to the user, information associated with putting personal camera 210 in the pairing mode, such as by displaying a list of instructions, a series of images, or the like. Companion device 220 may then repeat searching for personal camera 210 after personal camera 210 is in the pairing mode.

Returning to FIG. 5, process 500 may include receiving configuration information associated with the personal camera (block 520). For example, companion device 220 may receive configuration information associated with personal camera 210. In some implementations, companion device 220 may receive the configuration information when (e.g., before, after, concurrently with, etc.) companion device 220 establishes the connection with personal camera 210.

The configuration information may include information associated with a manner in which content (e.g., an image, a series of images, a video, audio, etc.), captured by personal camera 210, is to be displayed, uploaded, shared, and/or streamed by companion device 220.

In some implementations, the configuration information may include information associated with a social media application and/or a streaming application via which the content is to be displayed, uploaded, shared, and/or streamed. For example, the configuration information may include information that identifies the social media application and/or the streaming application, such as a name, an identification number, an address (e.g., uniform resource locator (URL), an Internet protocol (IP) address, etc.), or the like. As another example, the configuration information may include login information for a user account associated with the social media application and/or the streaming application, such as a username, a password, or the like. As yet another example, the configuration information may include information indicating whether the social media application and/or the streaming application is a default social media application and/or a default streaming application (e.g., when the configuration information includes information associated with multiple social media applications and/or multiple streaming applications). As an additional example, the configuration information may include information associated with a message to be displayed via the social media application, such as a message that may be posted to the user's social media account to inform other users of the social media application that the content is being displayed, uploaded, shared, and/or streamed via the streaming application and/or the social media application. In some implementations, the configuration information may include information associated with multiple social media applications and/or multiple streaming applications (e.g., such that the content may be displayed, uploaded, shared, and/or streamed via the multiple social media applications and/or the multiple streaming applications).

Figure 7A:
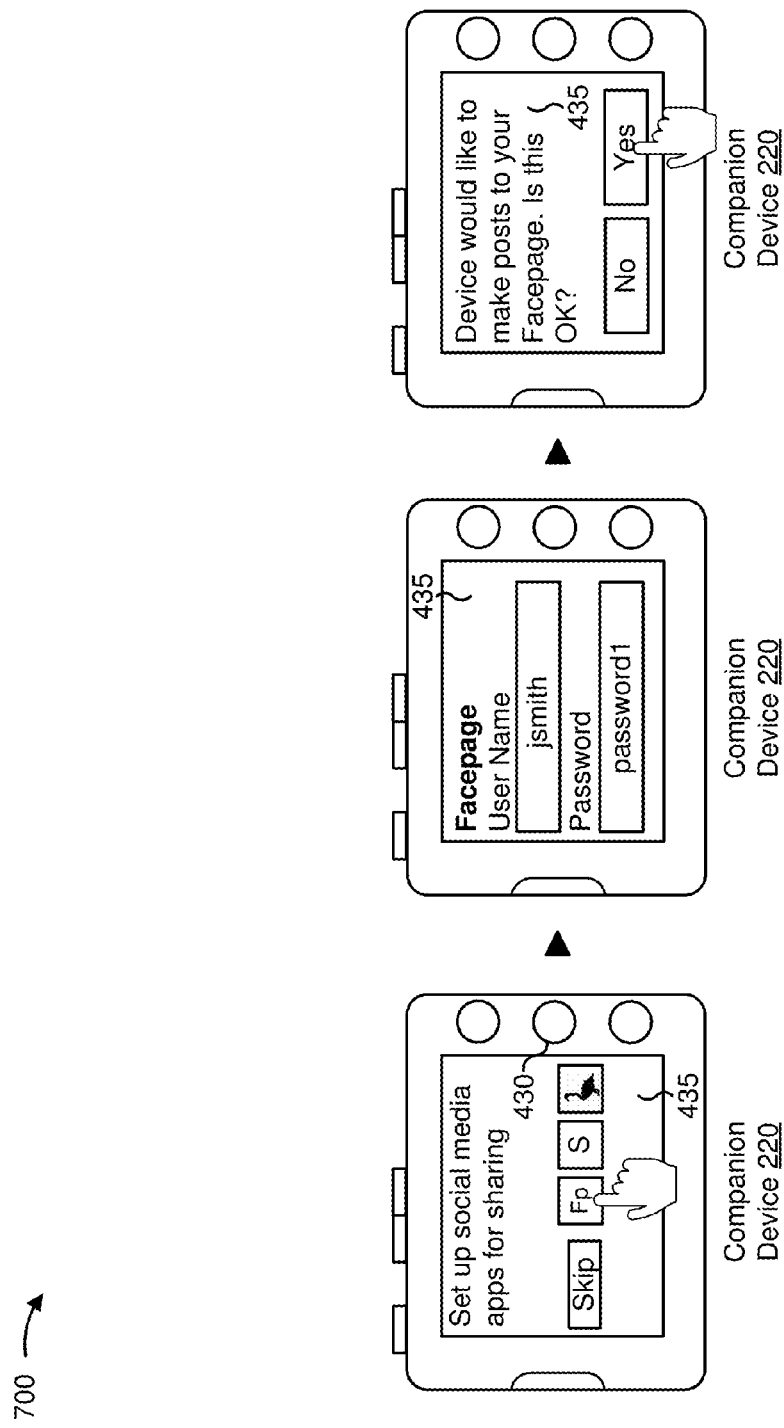
FIGS. 7A and 7B are diagrams of an example implementation of a companion device receiving configuration information, associated with a social media application, based on user input.
Figure 7B:
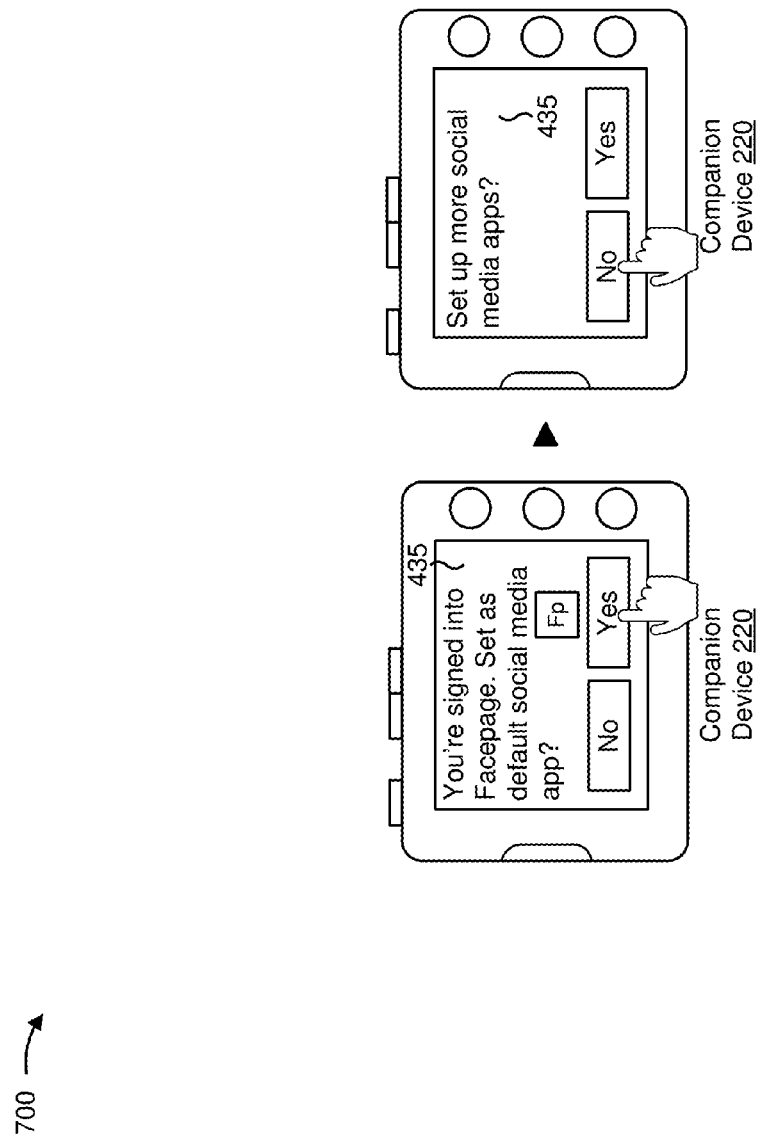

In some implementations, companion device 220 may receive the configuration based on user input. FIGS. 7A and 7B are diagrams of an example implementation 700 of companion device 220 receiving configuration information, associated with a social media application, based on user input. As shown in the left portion of FIG. 7A, companion device 220 may provide, for display via touch screen 435, a user interface associated with configuration information associated with a social media application. As shown, the user interface may allow the user to select (e.g., by touching a corresponding button located on touch screen 435, by pressing select/shutter button 430, etc.) a social media application. As also shown, the user interface may allow the user to indicate (e.g., by selecting a Skip button) that the user does not wish to provide configuration information associated with a social media application. Here, as shown, assume that companion device 220 receives user input indicating that the user wishes to provide configuration information associated with a particular social media application (e.g., Facepage). As shown by the center portion of FIG. 7A, companion device 220 may display a user interface associated with receiving login information for a user account associated with the selected social media application. As shown, companion device 220 may receive user input (e.g., via corresponding text boxes displayed via touch screen 435) associated with a username and a password for the user account. In some implementations, companion device 220 may communicate with server device 230, associated with the social media application, to validate the received login information.

As shown by the right portion of FIG. 7A, after companion device 220 receives the configuration information associated with the social media application, companion device 220 may prompt the user whether companion device 220 is permitted to display, upload, share, and/or stream content to the user's social media account (e.g., "Device would like to make posts to your Facepage account. Is this OK?"). As another example, companion device 220 may prompt the user to accept or reject terms of service associated with the social media application. Companion device 220 may then receive user input (e.g., based on a user selection of a Yes button or a No button displayed via touch screen 435) indicating whether companion device 220 may do so.

As shown by the left portion of FIG. 7B, after companion device 220 receives the configuration information associated with the social media application, companion device 220 may prompt the user whether the social media application is to be a default social media application (e.g., "You're signed into Facepage. Set as your default social media application?"), and the user may provide input, accordingly. Additionally, or alternatively, companion device 220 may automatically identify the social media application as the default social media application (e.g., when the configuration information includes information associated with only one social media application). In some implementations, companion device 220 may receive (e.g., at a later time) user input associated with selecting a different social media application as the default social media application.

As shown in the right portion of FIG. 7B, companion device 220 may prompt the user regarding whether the user wishes to provide configuration information associated with another social media application (e.g., "Set up more social networks?"). Companion device 220 may then receive user input (e.g., based on a user selection of a Yes button or a No button displayed via touch screen 435) indicating whether the user wishes to provide configuration information associated with another social media application. In this example, as shown, assume companion device 220 receives an indication that the user does not wish to provide configuration information associated with additional social media applications. In this way, companion device 220 may receive configuration information associated with one or more social media applications associated with displaying, uploading, sharing, and/or streaming content captured by personal camera 210.

Figure 8A:
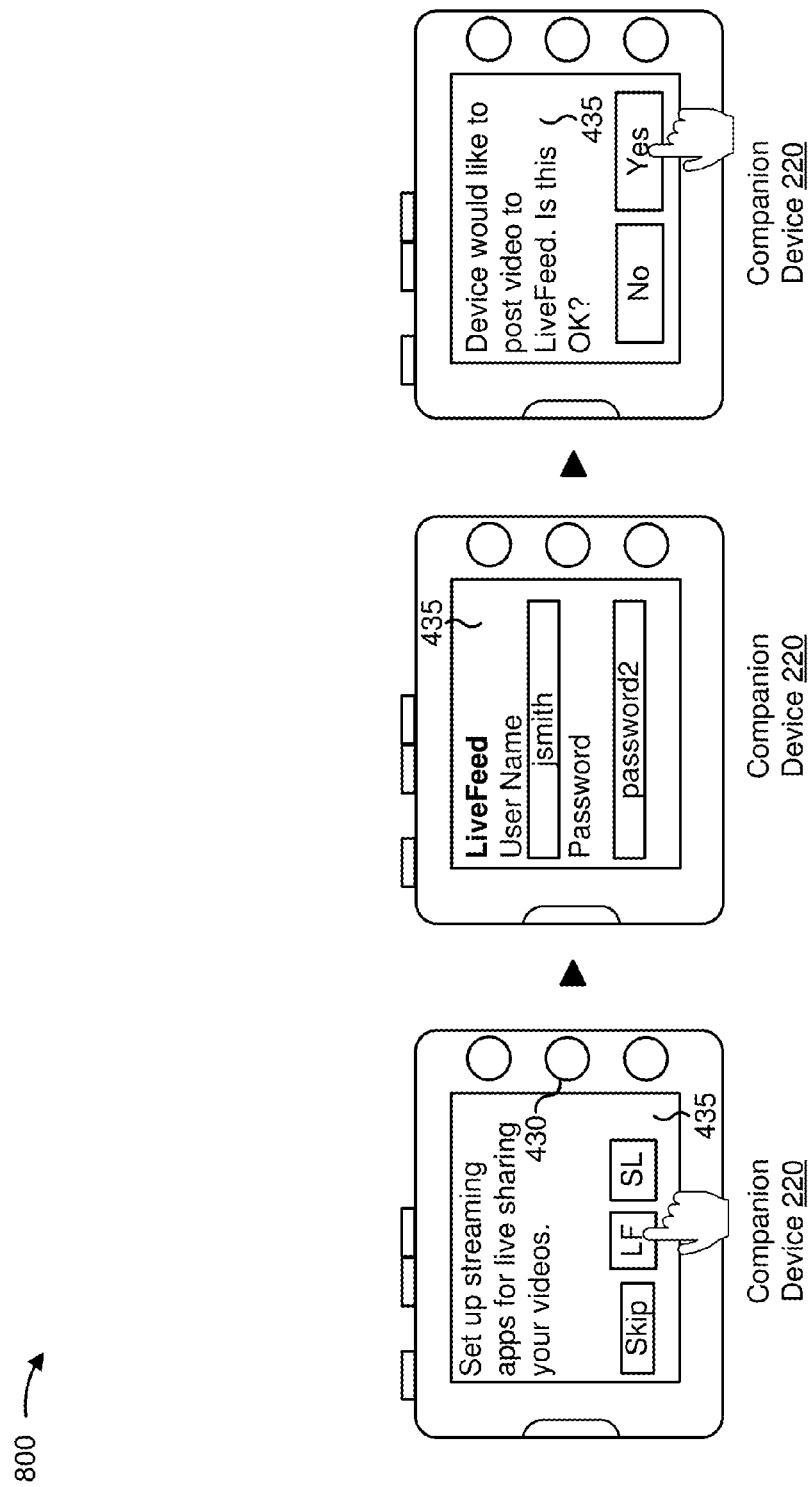
FIGS. 8A and 8B are diagrams of an example implementation of a companion device receiving configuration information, associated with a streaming application, based on user input.
Figure 8B:
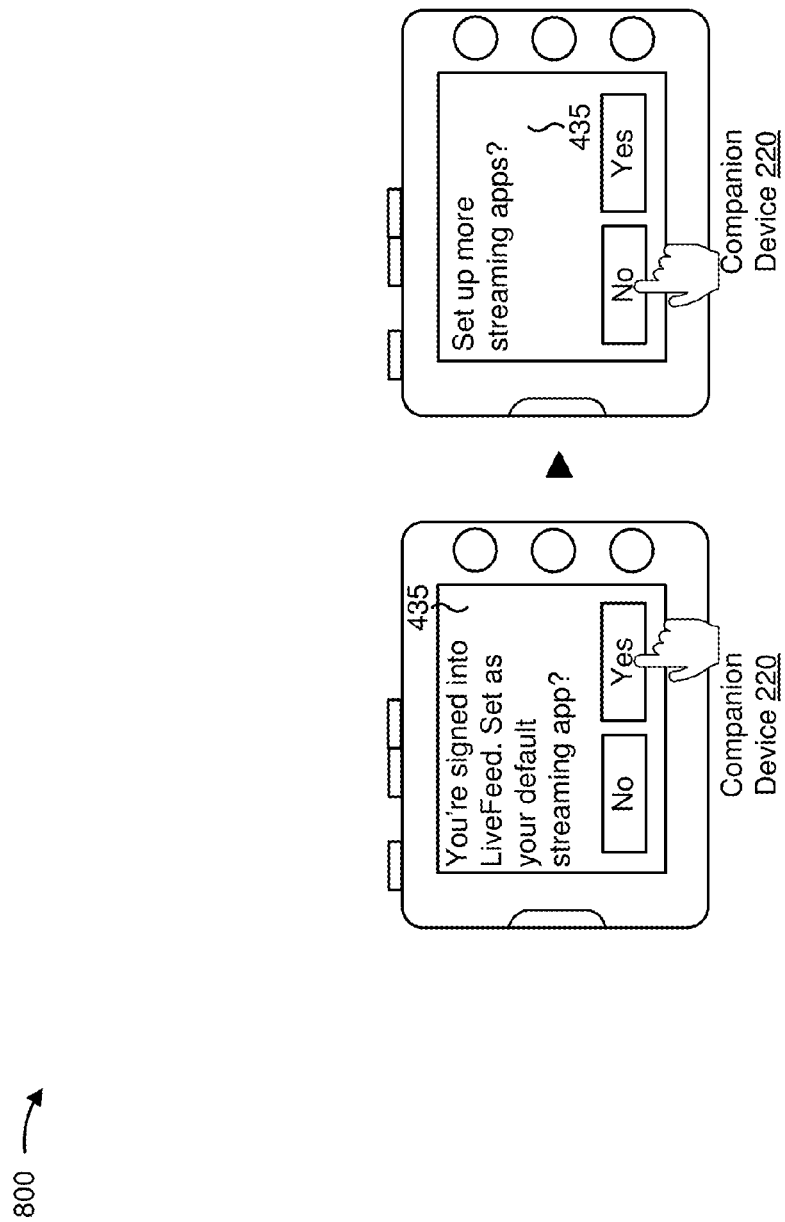

FIGS. 8A and 8B are diagrams of an example implementation 800 of companion device 220 receiving configuration information, associated with a streaming application, based on user input. As shown in the left portion of FIG. 8A, companion device 220 may provide, for display via touch screen 435, a user interface associated with receiving configuration information associated with a streaming application. As shown, the user interface may allow the user to select (e.g., by touching a corresponding button located on the user interface and/or a physical button of companion device 220) a streaming application. As also shown, the user interface may allow the user to indicate (e.g., by selecting a Skip button displayed via touch screen 435) that the user does not wish to provide configuration information associated with a streaming application. Here, as shown, assume that companion device 220 receives user input indicating that the user wishes to provide configuration information associated with a particular streaming application (e.g., LiveFeed). As shown by the center portion of FIG. 8A, companion device 220 may display a user interface associated with receiving login information for a user account associated with the streaming application. As shown, companion device 220 may receive user input (e.g., via corresponding text boxes displayed via touch screen 435) associated with a user name and a password for the user account. In some implementations, companion device 220 may communicate with server device 230, associated with the streaming application, to validate the login information.

As shown by the right portion of FIG. 8A, after companion device 220 receives the configuration information associated with the streaming application, companion device 220 may prompt the user whether companion device 220 is permitted to display, upload, share, and/or stream content via the user's streaming application account (e.g., "Device would like to post video to your LiveFeed account. Is this OK?"). As another example, companion device 220 may prompt the user to accept or reject terms of service associated with the streaming application. Companion device 220 may then receive user input (e.g., based on a user selection of a Yes button or a No button displayed via touch screen 435) indicating whether companion device 220 may do so.

As shown by the left portion of FIG. 8B, after companion device 220 receives the configuration information associated with the streaming application, companion device 220 may prompt the user whether the streaming application is to be a default streaming application (e.g., "You're signed into LiveFeed. Set as your default streaming application?"), and the user may provide input, accordingly. Additionally, or alternatively, companion device 220 may automatically identify the streaming application as the default streaming application (e.g., when the configuration information includes information associated with only one streaming application). In some implementations, companion device 220 may receive (e.g., at a later time) user input associated with selecting a different streaming application as the default streaming application.

As shown in the right portion of FIG. 8B, companion device 220 may prompt the user regarding whether the user wishes to provide configuration information associated with another streaming application (e.g., "Set up more streaming applications?"). Companion device 220 may then receive user input (e.g., based on a user selection of a Yes button or a No button displayed via touch screen 435) indicating whether the user wishes to provide configuration information associated with another streaming application. In this example, as shown, assume companion device 220 receives an indication that the user does not wish to provide configuration information associated with additional streaming applications. In this way, companion device 220 may receive configuration information associated with one or more streaming applications associated with displaying, uploading, sharing, and/or streaming content captured by personal camera 210.

In some implementations, companion device 220 may receive the configuration information based on user input, as described above. Additionally, or alternatively, companion device 220 may receive the configuration information from another device, such as personal camera 210 and/or server device 230.

In some implementations, companion device 220 may receive updated configuration information. For example, companion device 220 may receive (e.g., based on user input) configuration information associated with companion device 220. Here, the user may modify the configuration information (e.g., when the user edits the configuration information, adds configuration information, deletes configuration information, etc.) to create the updated configuration information.

Returning to FIG. 5, process 500 may include storing the configuration information (block 530). For example, companion device 220 may store the configuration information. Additionally, or alternatively, companion device 220 may provide the configuration information for storage by another device, such as personal camera 210. In some implementations, companion device 220 may store the configuration information after companion device 220 receives the configuration information. Additionally, or alternatively, companion device 220 may store the configuration information when companion device 220 receives an indication that companion device 220 is to store the configuration information from another device, personal camera 210 and/or server device 230.

In some implementations, companion device 220 may store the configuration information in a memory location (e.g., a RAM, a ROM, a cache, a hard disk, etc.) of companion device 220. In some implementations, companion device 220 may store the configuration information such that previous configuration information (e.g., configuration information received by companion device 220 at an earlier time) is supplemented, modified, overwritten, deleted, or the like. Additionally, or alternatively, companion device 220 may store the configuration information such that companion device 220 may retrieve the configuration information at a later time (e.g., when companion device 220 receives an indication that content is to be displayed, uploaded, shared, and/or streamed based on the configuration information).

In some implementations, companion device 220 may store the configuration information in association with information that identifies personal camera 210, such as a device name, a device identification number, a device PIN, or the like. As such, when companion device 220 pairs with a particular personal camera 210, companion device 220 may retrieve the configuration information for the particular personal camera 210. Therefore, in some implementations, companion device 220 may store different configuration information for different personal cameras 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 9 is a flow chart of an example process 900 for causing content, captured by a personal camera, to be streamed. In some implementations, one or more process blocks of FIG. 9 may be performed by companion device 220. In process 900, assume that companion device 220 has established a connection with a personal camera 210, in the manner described above.

As shown in FIG. 9, process 900 may include receiving an indication to stream content captured by a personal camera (block 910). For example, companion device 220 may receive an indication that content, captured by personal camera 210, is to be streamed. In some implementations, companion device 220 may receive the indication when a user of companion device 220 provides information associated with the indication. Additionally, or alternatively, companion device 220 may receive the indication when another device provides the indication, such as personal camera 210.

In some implementations, companion device 220 may receive the indication when companion device 220 is in a wait mode. For example, as described above, companion device 220 may be in the wait mode when companion device 220 displays a video feed view from personal camera 210, but is not uploading, sharing, and/or streaming content captured by personal camera 210. Here, companion device 220 may display (e.g., over the video feed, adjacent to the video feed, etc.) record button 440, picture button 445, stream button 450, and playback button 455. In this example, companion device 220 may receive the indication that companion device 220 is to begin streaming the content captured by personal camera 210 based on user input, such as a user selection (e.g., via touch screen 435 and/or use of up button 420, down button 425, and/or select/shutter button 430) of stream button 450, voice input provided via speaker/microphone 415, or the like.

Additionally, or alternatively, companion device 220 may receive the indication when companion device 220 is in a record mode. In some implementations, companion device 220 may be in the record mode when companion device 220 causes personal camera 210 to begin recording a video, audio, a series of images, or the like, captured by personal camera 210.

Figure 10:
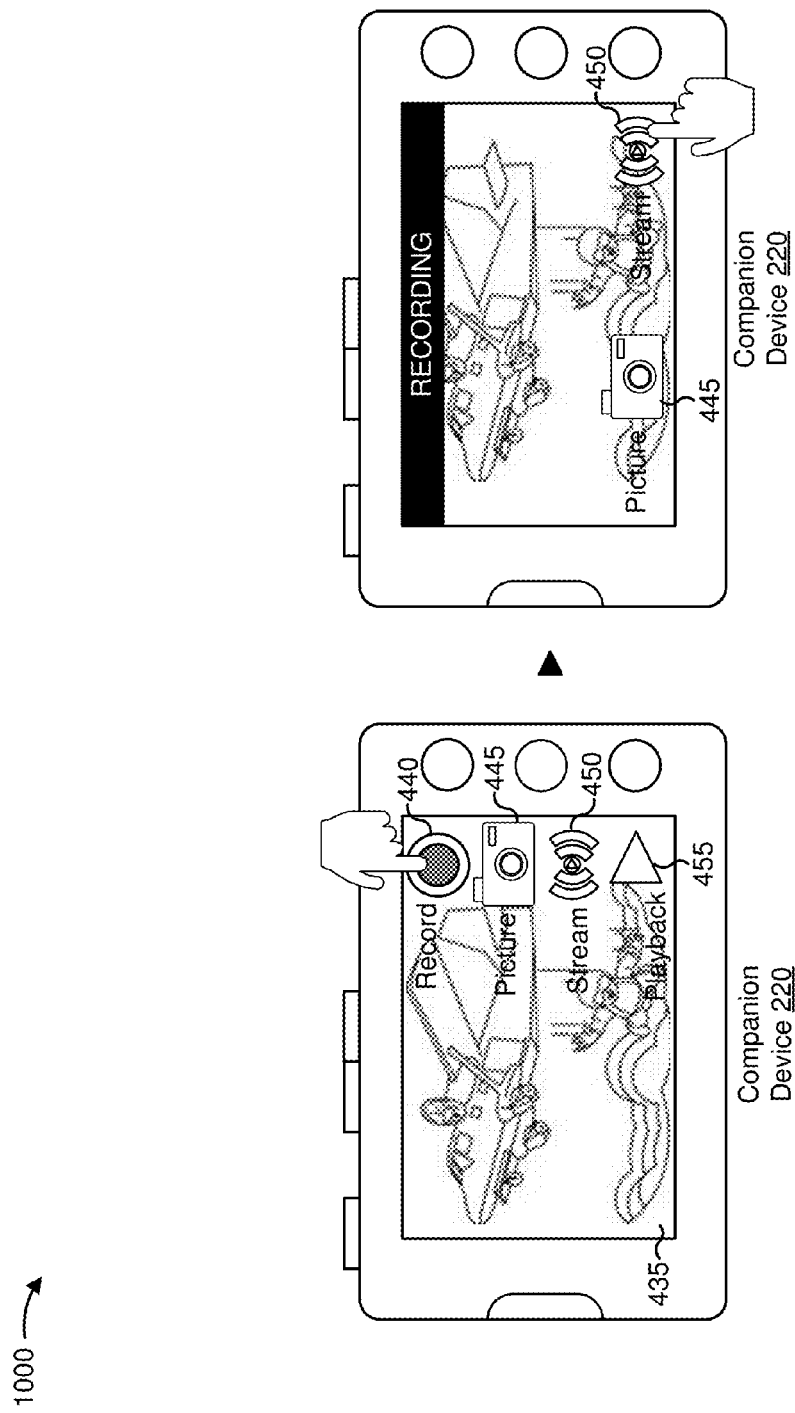
FIG. 10 is a diagram of an example implementation of a companion device receiving an indication to stream content captured by a personal camera when the companion device is in a record mode.

FIG. 10 is a diagram of an example implementation 1000 of companion device 220 receiving the indication to stream content captured by personal camera 210 when companion device 220 is in the record mode. As shown in the left portion of FIG. 10, assume that companion device 220 is in wait mode and displays record button 440, picture button 445, stream button 450, and playback button 455 on top of the video feed from personal camera 210. As shown, companion device 220 may receive, based on a user selection of record button 440, user input indicating that companion device 220 is to cause personal camera 210 to begin recording content (e.g., a video, audio, a series of images, etc.). As shown in the right portion of FIG. 10, companion device 220, may cause personal camera 210 to begin recording the content (e.g., by communicating with personal camera 210 via the established connection), and may enter a record mode. As shown, while in the record mode, companion device 220 may display a banner indicating that personal camera 210 is recording video (e.g., "RECORDING"), picture button 445, and stream button 450 on top of the video feed from personal camera 210. In some implementations, while in the record mode, companion device 220 may only display stream button 450 when companion device 220 stores or has access to configuration information associated with a default streaming application.

In some implementations, as shown, companion device 220 may not display playback button 455 and/or one or more other virtual input elements while companion device 220 is in the record mode. In some implementations, companion device 220, while in the record mode, may receive (e.g., based on a user selection of picture button 445, based on the user pressing select/shutter button 430 once, etc.) an indication to cause personal camera 210 capture an image during recording of the video. In some implementations, companion device 220 may display an animation (e.g., a shutter animation) to indicate that personal camera 210 has captured the image. Additionally, or alternatively, companion device 220 may, after causing personal camera 210 to capture the image, display (e.g., in a portion of touch screen 435) an image preview for a period of time, such as three seconds, five seconds, or the like. In some implementations, companion device 220 may display the captured image in a full screen view based on a user selection of the preview image.

Additionally, or alternatively, companion device 220, while in record mode, may receive (e.g., based on the user pressing select/shutter button 430 twice in rapid succession, etc.) an indication that personal camera 210 is to stop recording, and companion device 220 may cause personal camera 210 to stop recording, and personal camera 210 may store the captured video.

Continuing with this example, companion device 220 may receive the indication that companion device 220 is to stream the video being recorded by personal camera 210 based on a user selection of stream button 450 while companion device 220 is in the record mode. Here, companion device 220 may enter a streaming mode and may begin streaming the video (e.g., while personal camera 210 continues recording the video), as described in further detail below.

In some implementations, companion device 220 may receive the indication based on user input. For example, as described above, companion device 220 may receive the indication based on touch input via one or more physical input elements located on companion device 220 and/or one or more virtual input elements displayed by companion device 220. Additionally, or alternatively, companion device 220 may automatically receive the indication to stream based on causing personal camera 210 to record the content (e.g., immediately when recording begins, a period of time after recording begins, such as five minutes, etc.).

Figure 11A:
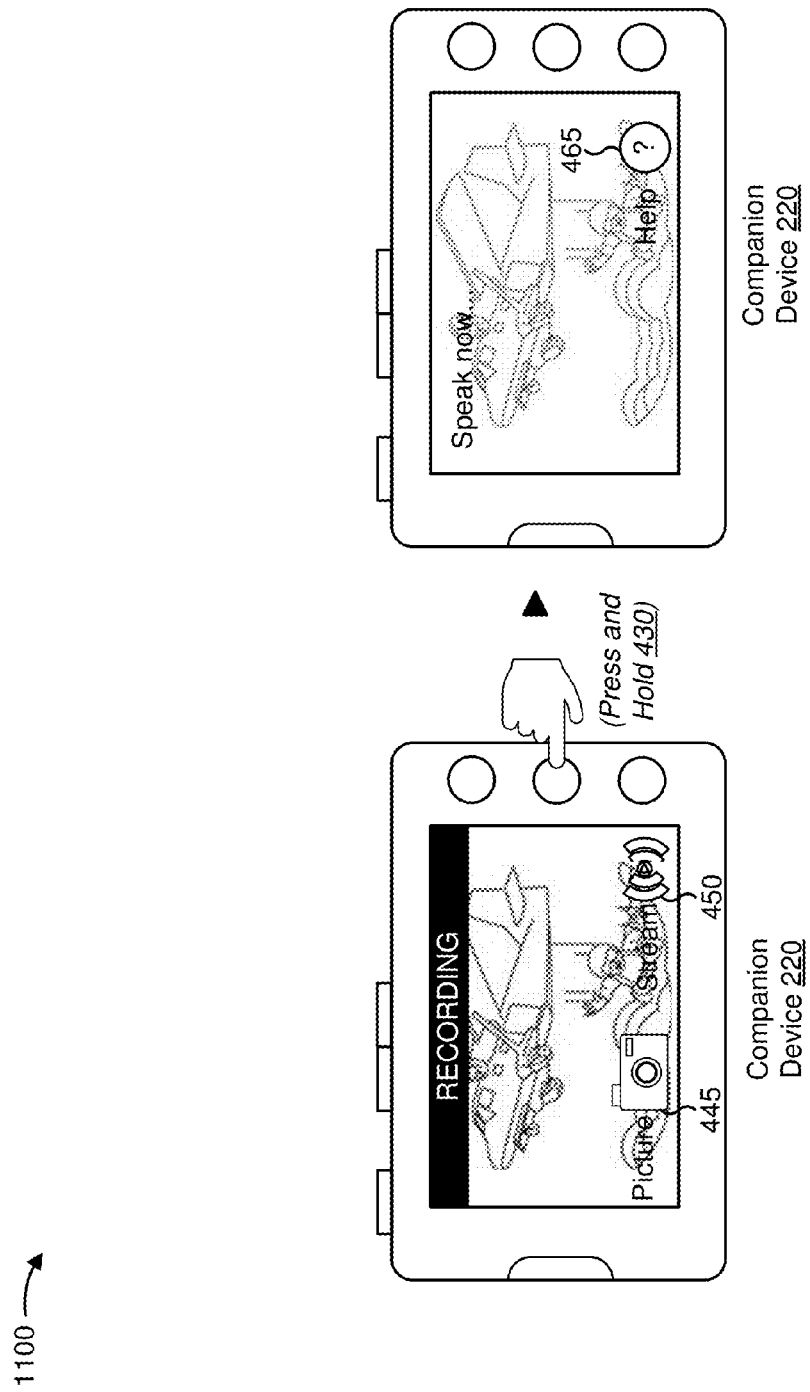
FIGS. 11A and 11B are diagrams of an example implementation of a companion device receiving an indication to stream content based on voice input.
Figure 11B:
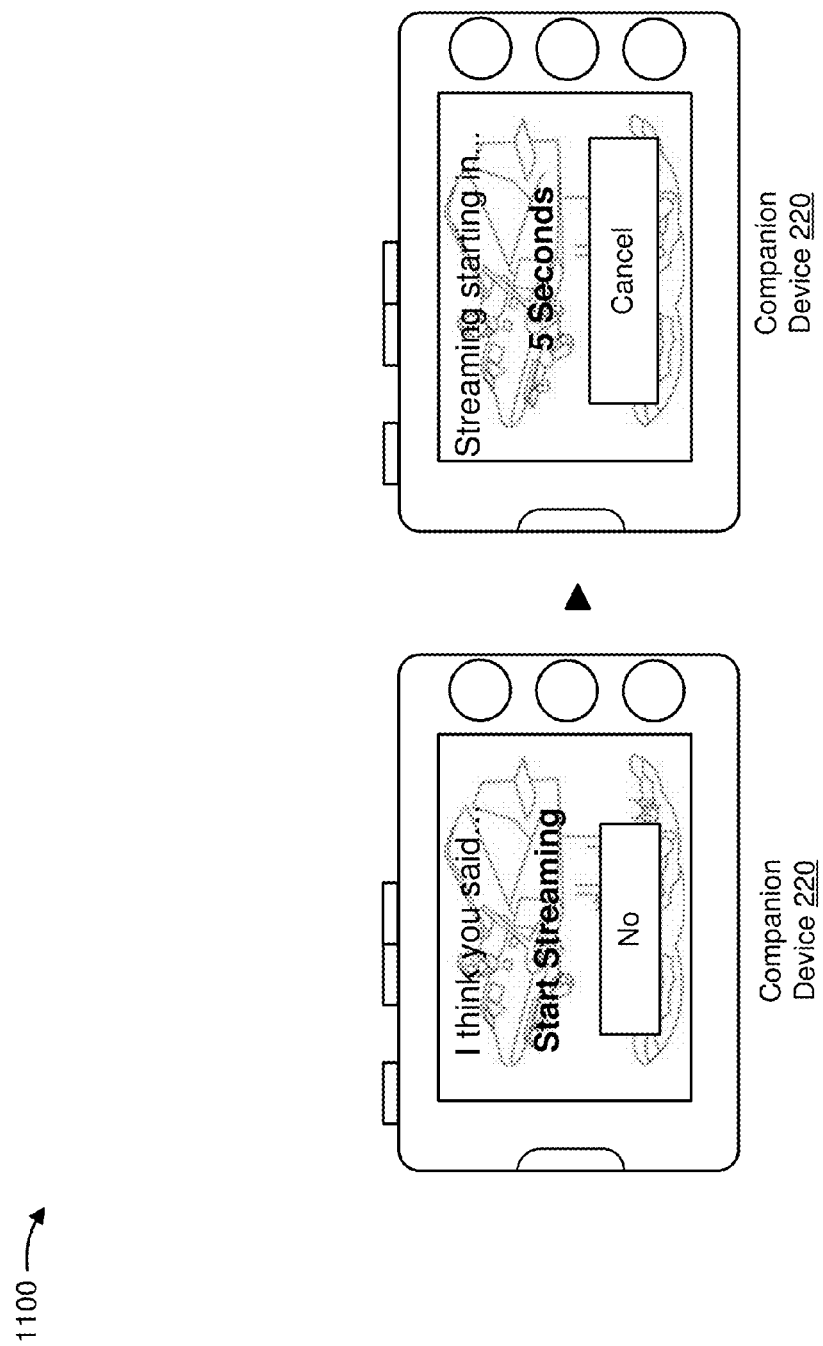

As another example, companion device 220 may receive voice input indicating that companion device 220 is to stream the content, such as voice input provided via speaker/microphone 415, an ear piece (e.g., worn by the user) paired with companion device 220, or the like. FIGS. 11A and 11B are diagram of an example implementation 1100 of companion device 220 receiving the indication to stream the content based on voice input. As shown in the left portion of FIG. 11A, companion device 220 may receive user input indicating that the user wishes to provide voice input based on, for example, companion device 220 detecting that the user has pressed and held select/shutter button 430 while companion device 220 is in recording mode, companion device 220 detecting a particular verbal command from the user, or the like. In some implementations, companion device 220 may receive a similar indication when companion device 220 is in another mode, such as the wait mode, a streaming mode, a playback mode, or the like. As shown by the right portion of FIG. 11A, in some implementations, companion device 220 may display an indication that companion device 220 is prepared to receive the voice input (e.g., "Speak now . . . ") and/or may provide an audible indication (e.g., a beep, a spoken word, etc.) that companion device 220 is prepared to receive the voice input. In this example, assume that the user says "start streaming," and that companion device 220 is configured to recognize such voice input as an indication that companion device 220 is to start streaming the content. As shown by the left portion of FIG. 11B, companion device 220 may display information associated with confirming the voice input in order to allow the user to cancel the voice input, try a different voice input, or the like, by, for example, selecting a No button, speaking the work "no", speaking a different voice command, or the like. In some implementations, companion device 220 may be capable of listing available voice commands such that the user may view the list. For example, companion device 220 may display the list of available voice commands when companion device 220 receives "help" in the form of voice input, when companion device 220 receives user input a user selection of help button 465 displayed by companion device 220, or the like. In some implementations, companion device 220 may be capable of receiving voice input associated with starting and/or stopping streaming of the content, recording and/or stopping recording of the content, capturing an image, starting and/or stopping playback of the content, or the like.

As shown by the right portion of FIG. 11B, companion device 220 may act on the received voice input indicating that companion device 220 is to start streaming the content. For example, companion device 220 may begin streaming the content after the user confirms the voice input and/or after companion device 220 waits, after receiving the voice input, for a threshold period of time without receiving additional user input, such as a two seconds, five seconds, or the like. As shown, in some implementations, companion device 220 may initiate a timer associated with acting on the voice input (e.g., "Streaming starting in 5 seconds . . . ") and may act on the received voice input upon expiration of the timer. In this example, companion device 220 may begin streaming the content, as described in further detail below.

Returning to FIG. 9, process 900 may include determining configuration information associated with the personal camera (block 920). For example, companion device 220 may determine configuration information associated with personal camera 210. In some implementations, companion device 220 may determine the configuration information when companion device 220 receives the indication to stream the content captured by personal camera 210. Additionally, or alternatively, companion device 220 may determine the configuration information at another time, such as when companion device 220 powers-on, when companion device 220 establishes a connection with personal camera 210, or the like, as described above.

In some implementations, companion device 220 may determine the configuration information based on user input. For example, companion device 220 may determine configuration information that identifies a streaming application and/or a social media application, associated with streaming the content, based on user input (e.g., when the configuration information stored or accessible by companion device 220 does not identify a default streaming application and/or a default social media application).

Figure 12A:
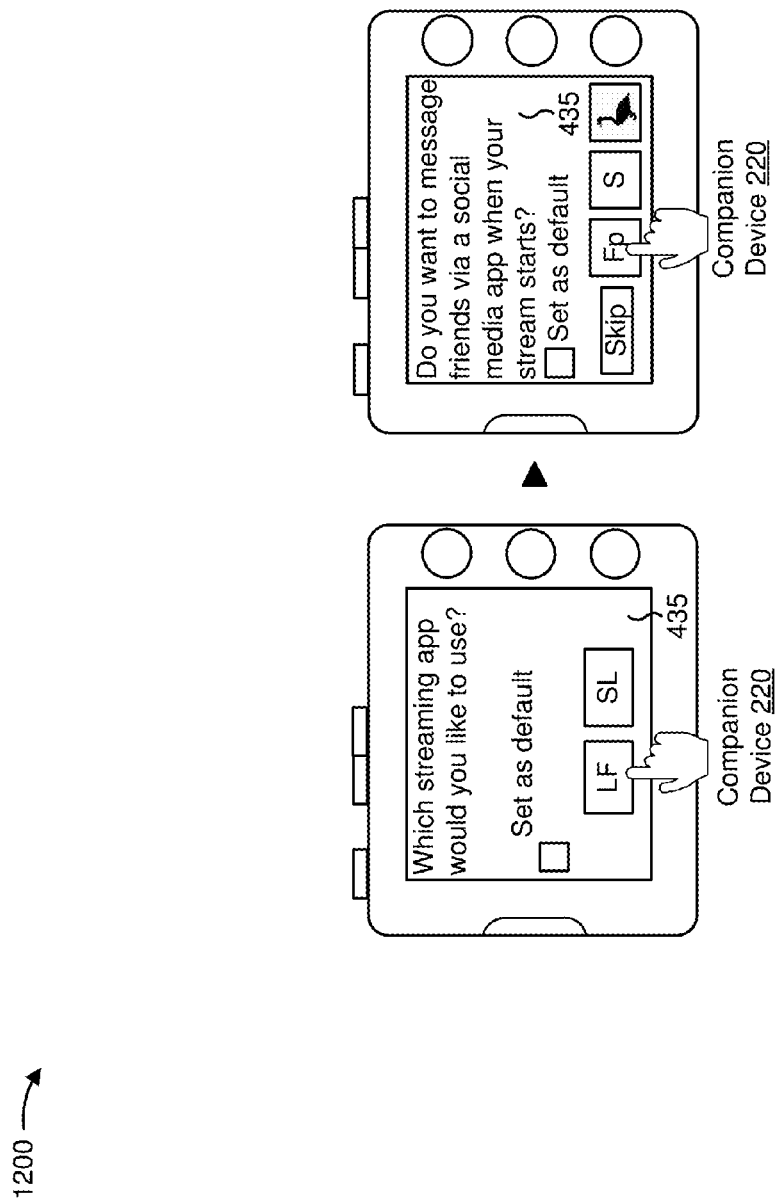
FIGS. 12A and 12B are diagrams of an example implementation of a companion device determining configuration information, associated with streaming content, when configuration information, stored or accessible by the companion device, does not identify a default streaming application and/or a default social media application.
Figure 12B:
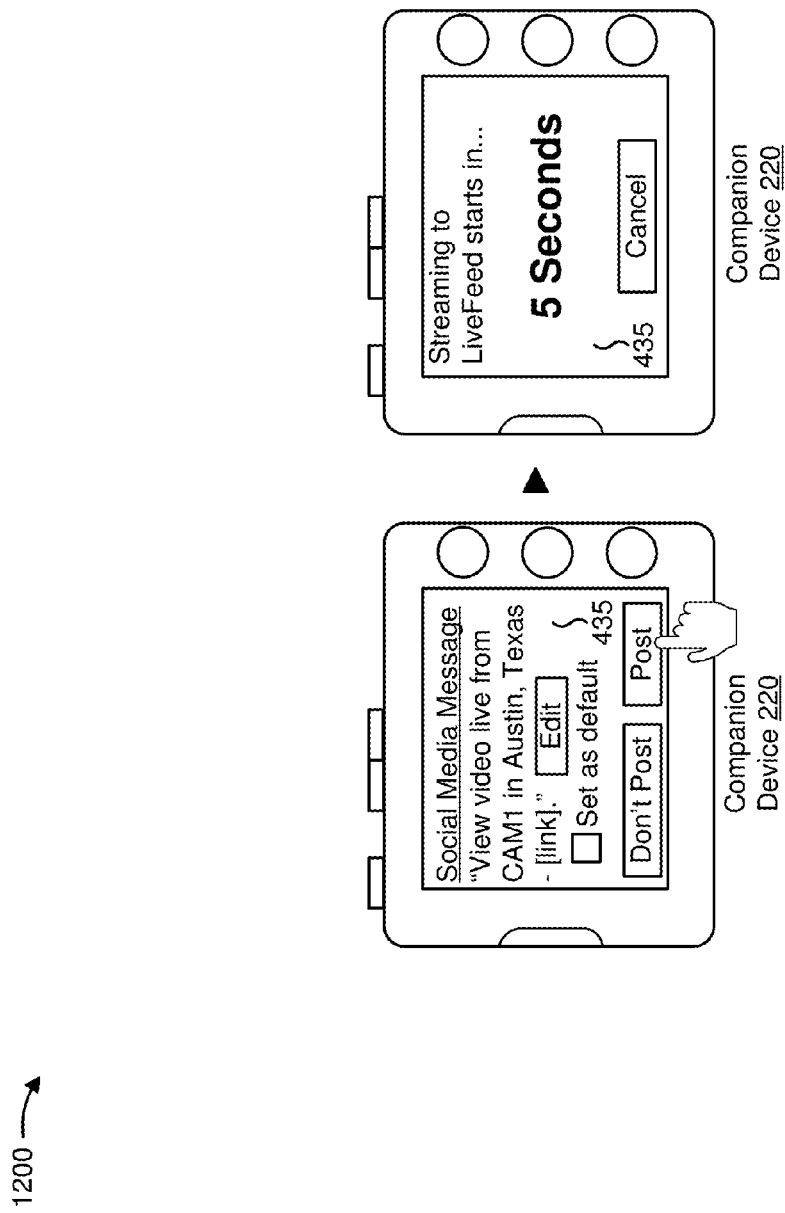

FIGS. 12A and 12B are diagrams of an example implementation 1200 of companion device 220 determining configuration information, associated with streaming the content, when configuration information, stored or accessible by companion device 220, does not identify a default streaming application and/or a default social media application. For the purposes of example implementation 1200, assume that companion device 220 stores or has access to configuration information associated with multiple streaming applications and multiple social media applications.

As shown by the left portion of FIG. 12A, based on receiving the indication to stream the content, companion device 220 may display a user interface associated with identifying a default streaming application of the multiple streaming applications. As shown, companion device 220 may prompt the user to select a streaming application, of the multiple streaming applications, by displaying a query and multiple icons associated with the multiple streaming applications. As shown, companion device 220 may also provide an input element (e.g., a check box) associated with identifying the selected streaming application as the default streaming application (e.g., for future streaming). As shown, assume that companion device 220 receives, based on a user selection of a particular icon (e.g., a LiveFeed icon), an indication that companion device 220 is to stream the content via a particular streaming application (e.g., the LiveFeed streaming application). In some implementations, companion device 220 may allow the user to select more than one streaming application for streaming of the content.

As shown by the right portion of FIG. 12A, after companion device 220 determines the configuration information associated with the streaming application, companion device 220 may display a user interface associated with identifying one or more social media applications associated with streaming the content. In some implementations, companion device 220 may cause the content be streamed via the one or more social media applications (e.g., in addition to using the streaming application).

Additionally, or alternatively, companion device 220 may cause a message, associated with streaming the content, to be shared via the one or more social media applications. For example, companion device 220 may cause a message (e.g., a text message, a video message, an email, a hyperlink associated with viewing the streamed content, location information associated with companion device 220, such as a set of global positioning system (GPS) coordinates, etc.) to be shared via one or more social media applications associated with the user. In other words, companion device 220 may cause a message to be shared such that viewers (e.g., friends of the user, contacts of the user, followers of the user, etc.), associated with viewing devices 240, may be notified that content, associated with the user, is begin streamed. For the purposes of example implementation 1200, assume that companion device 220 is configured to provide a message, associated with the content, to be shared via one or more social media applications selected by the user.

As shown, companion device 220 may prompt the user to indicate whether companion device 220 is to share a message via one or more social media applications by displaying a query and multiple icons associated with the multiple social media applications. As shown, companion device 220 may also provide an input element (e.g., a check box) associated with identifying a selected social media application as the default social media application (e.g., for future messages). As shown, assume that companion device 220 receives, based on a user selection of a particular icon (e.g., a Facepage icon), an indication that companion device 220 is to provide a message via a particular social media application (e.g., the Facepage social media application). In some implementations, companion device 220 may allow the user to select more than one social media application via which the message may be provided.

In some implementations, companion device 220 may indicate (e.g., by graying-out a corresponding icon) that the configuration information does not include login information associated with a social media application, and companion device 220 may allow the user to provide the login information (e.g., when the user selects the grayed-out icon).

As further shown, companion device 220 may also display input element (e.g., a Skip button) that, when selected by the user, indicates that companion device 220 is not to cause the message to be provided via any social media application.

As shown in the left portion of FIG. 12B, after determining the configuration information associated with identifying the social media application via which the message is to be provided, companion device 220 may display a user interface associated with generating the message. As shown, companion device 220 may display a message (e.g., a preconfigured message identified in the configuration information) stored by companion device 220, (e.g., "View video live from CAM1 in Austin, Tex.—[link]"). In some implementations, companion device 220 may allow the user to edit, alter, and/or modify the message via touch screen 435. As further shown, companion device 220 may also display an input element (e.g., a check box) that, when selected, causes companion device 220 to store the message as a default message (e.g., such that the message may be provided in association with future streaming). As further shown, companion device 220 may receive (e.g., based on a user selection of a Post button) an indication that companion device 220 is to cause the message to be provided via the social media application (e.g., via server device 230) when companion device 220 starts streaming the content.

As shown by the right portion of FIG. 12B, after companion device 220 receives the configuration associated with the social media message, companion device 220 may start a timer associated with starting to stream the content (e.g., "Streaming to LiveFeed starts in 5 seconds . . . ") and may cause the content to be streamed upon expiration of the timer, as described in further detail below.

Additionally, or alternatively, companion device 220 may determine the configuration information based on information stored by companion device 220. For example, companion device 220 may receive and store configuration information, in the manner described above with regard to FIG. 4 through FIG. 7, and may determine the configuration information based on the stored information (e.g., when the configuration information stored or accessible by companion device 220 identifies the default streaming application and/or the default social media application). In this example, companion device 220 may identify the streaming application as the default streaming application, and the social media as the default social media application.

In some implementations, companion device 220 may receive an indication (e.g., based on a user selection of a streaming application identifier displayed by companion device 220) that the user wishes to select a streaming application other than the default streaming application, and companion device 220 may determine configuration information that identifies the other streaming application, accordingly (e.g., in the manner described above with regard to example implementation 1200). Additionally, or alternatively, companion device 220 may also determine configuration associated with the message to be provided via the default application (e.g., in the manner described above, based on a default message included in the configuration information, etc.).

Returning to FIG. 9, process 900 may include streaming the content based on the configuration information (block 930). For example, companion device 220 may stream the content based on the configuration information. In some implementations, companion device 220 may stream the content after companion device 220 determines the configuration information. Additionally, or alternatively, companion device 220 may stream the content when companion device 220 receives an indication that companion device 220 is to stream the content based on user input and/or from another device, such as server device 230 associated with streaming the content.

In some implementations, companion device 220 may stream the content by providing the content via network 250. For example, companion device 220 may provide the content via an LTE network via which companion device 220 is capable of communicating. In this example, companion device 220 may receive the content from personal camera 210, and may stream the content (e.g., in real-time, in near real-time, immediately after the content is captured) to server device 230, associated with the streaming application and/or the social media application, via the LTE network. Additionally, or alternatively, companion device 220 may provide the message, associated with the social media application, such that viewers, associated with viewing devices 240, may view the message and begin viewing the streamed content (e.g., by following a link included in the message, by navigating to a website associated with the streaming application, etc.). In some implementations, a quality of the content streamed by companion device 220 may different than a quality of content recorded by personal camera 210. For example, a video quality of video content streamed by companion device 220 may be lower than a video quality of video content stored by personal camera 210. Additionally, or alternatively, the quality of the streamed content may be the same as or better than the quality of the recorded content. In some implementations, companion device 220 may enter a streaming mode when companion device 220 starts streaming the content. For example, companion device 220 may enter the streaming mode from the wait mode and/or the record mode (e.g., when companion device 220 previously receives an indication associated with recording the content).

Figure 13:
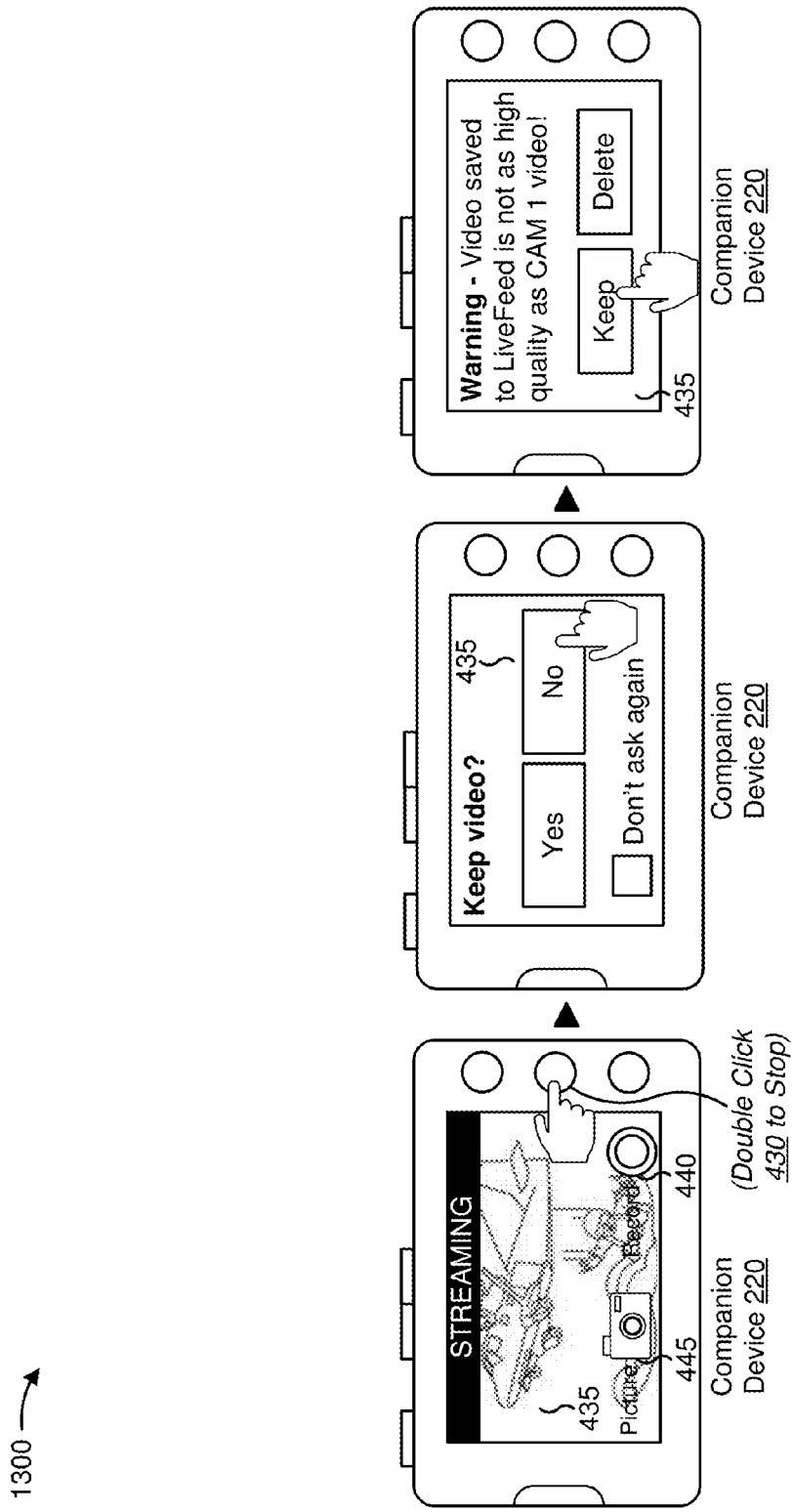
FIG. 13 is a diagram of an example implementation that shows a companion device in a streaming mode associated with streaming a content.

FIG. 13 is a diagram of an example implementation 1300 that shows companion device 220 in the streaming mode associated with streaming the content. As shown in the left portion of FIG. 13, while in the streaming mode, companion device 220 may display the content from personal camera 210, a banner indicating that personal camera 210 is streaming the content (e.g., "STREAMING"), picture button 445, and record button 440 on top of the video feed from personal camera 210.

In some implementations, as shown, companion device 220 may not display playback button 455 and/or one or more other virtual input elements while companion device 220 is in the streaming mode. In some implementations, companion device 220, while in the streaming mode, may receive (e.g., based on a user selection of picture button 445, based on the user pressing select/shutter button 430 once, etc.) an indication to cause personal camera 210 capture an image while streaming the content. In some implementations, companion device 220 may display an animation (e.g., a shutter animation) to indicate that personal camera 210 has captured the image. Additionally, or alternatively, companion device 220 may, after causing personal camera 210 to capture the image, display (e.g., in a portion of touch screen 435) an image preview for a period of time, such as three seconds, five seconds, or the like. In some implementations, companion device 220 may display the captured image in a full screen view based on a user selection of the preview image.

Additionally, or alternatively, companion device 220, while in the streaming mode, may receive (e.g., based on the user pressing select/shutter button 430 twice in rapid succession, etc.) an indication that personal camera 210 is to stop streaming, and companion device 220 may stop streaming the content accordingly.

In some implementations, companion device 220 may be configured to automatically cause personal camera 210 to record the content while companion device 220 is streaming the content. Additionally, or alternatively, companion device 220 may cause personal camera 210 to record the content based on receiving user input, such as a user selection of record button 440, during streaming of the content. Additionally, or alternatively, companion device 220 may receive (e.g., based on a user selection of the record button) an indication that companion device 220 is to stop streaming the content while personal camera 210 continues to record the content, and companion device 220 may act accordingly.

As shown in the center portion of FIG. 13, after companion device 220 stops streaming the content, companion device 220 may prompt the user whether personal camera 210 is to store the content (e.g., when companion device 220 has not already caused personal camera 210 to record the content). As shown, assume that companion device 220 receives an indication that the user does not wish for personal camera 210 to store the content. As shown in the right portion of FIG. 13, in some implementations, companion device 220 may display, to the user, a warning associated with deleting the video (e.g., "Warning—Video saved to LiveFeed is not as high quality as the video saved to CAM1"), and may act based on a user selection in response to the warning (e.g., by causing the content to be deleted or by causing personal camera 210 to store the content).

In some implementations, companion device 220 may stop streaming the content based on user input, as described in the above example. Additionally, or alternatively, companion device 220 may stop streaming the content at another time, such as a threshold streaming time (e.g., 20 minutes, one hour, etc.), a threshold amount of data usage during streaming (e.g., 500 megabytes, one gigabyte, etc.), or the like.

Figure 14:
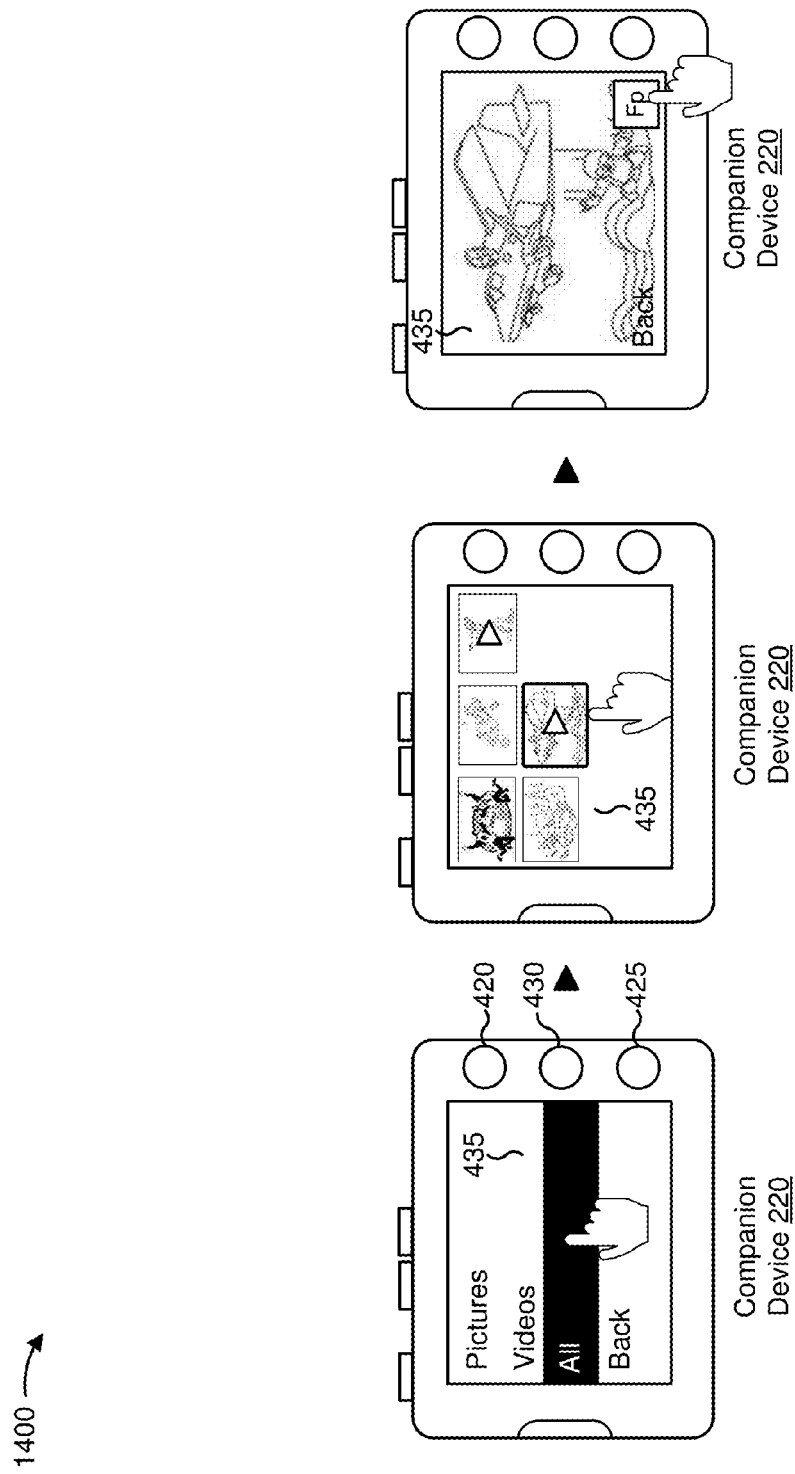
FIG. 14 is a diagram of an example implementation showing a manner in which a companion device may, at a later time, display, upload, and/or share content captured by personal camera.

In some implementations, companion device 220 may display, upload, and/or share the content, captured by personal camera 210, at a later time. For example, after personal camera 210 captures the content and/or after companion device 220 streams the content, companion device 220 may display the content via touch screen 435, upload and/or share the content via a social media application associated with server device 230, or the like. FIG. 14 is a diagram of an example implementation 1400 showing a manner in which companion device 220 may, at a later time, display, upload, and/or share the content captured by personal camera 210. As shown in the left portion of FIG. 14, companion device 220 may enter a playback mode associated with displaying, uploading, and/or sharing content captured by personal camera 210. For example, companion device 220 may enter the playback mode when companion device 220 detects a user selection of playback button 455 (e.g., while companion device 220 is in the wait mode). As shown, while in the playback mode, companion device 220 may allow the user to navigate (e.g., via touch screen 435, up button 420, down button 425, and/or select/shutter button 430) a playback menu (e.g., Images, Videos, All, Back, etc.) that allows the user to access content captured by personal camera 210. As shown, assume that companion device 220 detects a user selection of the All menu item. As shown by the center portion of FIG. 14, companion device 220 may, upon detection of the selection of the menu item, display a group of preview images associated with each item of captured content corresponding to the selected menu item. In some implementations, the set of preview images may include input elements associated with sharing an item of content corresponding to the preview images, in the manner described below. In some implementations, the user may navigate the preview images using touch screen 435, up button 420, down button 425, and/or volume button 410, and may select a particular preview image via touch screen 435 and/or select/shutter button 430.

As shown in the right portion of FIG. 14, based on detecting a user selection of a particular preview item, companion device 220 may display the content (e.g., display an image, play a video, play audio, etc.). As further shown, companion device 220 may also display an input element (e.g., an icon) associated with uploading and/or sharing the selected item of content via a social media application. Here, when companion device 220 detects a user selection of the input element, companion device 220 may upload and/or share the item of content via the social media application (e.g., based on configuration information that identifies a default social media application, based on prompting the user to identify one or more social media applications via which the item of content is to be shared, etc.). Additionally, or alternatively, companion device 220 may display information indicating whether the item of media content was streamed and/or has already been uploaded and/or shared via a social media application.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Implementations described herein may allow a companion device to display, upload, share, and/or stream content, captured by a personal camera, while an activity is ongoing (e.g., in real-time, in near real-time, as the content is being captured, immediately after the content is captured, etc.). Implementations described herein may also allow the companion device to control the personal camera and/or the displaying, the uploading, the sharing, and/or the streaming of the content based on user input (e.g., touch input, voice input, etc.), provided via the companion device.

The foregoing disclosure provides illustration and description, but is not intended to be exhaustive or to limit the implementations to the precise form disclosed. Modifications and variations are possible in light of the above disclosure or may be acquired from practice of the implementations. For example, while implementations described herein are described in the context of companion device 220 being connected to (e.g., paired with) a single personal camera 210 for streaming of content captured by personal camera 210, in some implementations, companion device 220 may be (e.g., concurrently) connected to multiple personal cameras 210, and may stream content from the multiple personal cameras 210 at the same time, from a selected personal camera 210 of the multiple personal cameras 210, or the like.

Additionally, or alternatively, while implementations described herein may be described in the context of companion device 220 receiving the configuration information based on user input via companion device 220, in some implementations, companion device 220 may receive the configuration information in another manner. For example, companion device 220 may establish a connection with a user device, such as a smart phone, a tablet, a desktop computer, a laptop computer, or the like, and may receive the configuration information based on user input provided to the user device. As another example, companion device 220 may receive the configuration information from server device 230 that stores or has access to the configuration information.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
    display content being captured by a personal camera associated with a user,
        the personal camera being different than the device;
    receive an indication to stream the content,
        the indication being based on a user interaction with the device;
    determine, based on receiving the indication, configuration information associated with streaming the content,
        the configuration information including information that identifies a streaming application associated with streaming the content, and
        the configuration information including information that identifies a social media application associated with the user;
    provide, via the social media application, a notification that the content is to be streamed via the streaming application,
        the notification being provided for viewing by a viewer associated with the social media application;
    provide an indication that the device is prepared to receive voice input;
    receive, based on providing the indication, the voice input from the user,
        the voice input instructing the device to start streaming;
    request a confirmation of the voice input instructing the device to start streaming;
    initiate a timer based on requesting the confirmation;
    detect that the timer expired; and
    stream, based on detecting that the timer expired, the content using the streaming application,
        the content being streamed to allow the viewer to access the content via the streaming application and in real-time or near real-time relative to capturing of the content.

2. The device of claim 1, where the one or more processors, while displaying the content being captured by the personal camera, are to:
    cause the personal camera to record the content being captured by the personal camera; and
    where the one or more processors, when receiving the indication to stream the content captured by the personal camera, are to:
        receive the indication after causing the personal camera to record the content being captured by the personal camera.

3. The device of claim 1, where the one or more processors are to:
    pair with the personal camera; and
    where the one or more processors, when determining the configuration information, are to:
        determine the configuration information based on pairing with the personal camera.

4. The device of claim 1, where the one or more processors are further to:
    display a user interface associated with identifying the streaming application associated with streaming the content,
        the user interface including information associated with multiple streaming applications;
    receive, via the user interface and based on user input, the information that identifies the streaming application,
        the streaming application being one of the multiple streaming applications; and
    where the one or more processors, when determining the configuration information that identifies the streaming application associated with streaming the content, are to:
        determine the configuration information that identifies the streaming application based on the user input via the user interface.

5. The device of claim 1, where the one or more processors are further to:
    display a user interface associated with identifying the social media application associated with the user,
        the user interface including information associated with multiple social media applications;

receive, via the user interface and based on user input, the information that identifies the social media application associated with the user,
the social media application being one of the multiple social media applications; and
where the one or more processors, when determining the configuration information that identifies the social media application associated with the user, are to:
determine the configuration information that identifies the social media application based on the user input via the user interface.

6. The device of claim 1, where the one or more processors are further to:
store information that identifies at least one of the social media application or the streaming application as a respective default social media application or a default streaming application; and
where the one or more processors, when determining the configuration information, are to:
identify the social media application or the streaming application based on the stored information.

7. The device of claim 1, where the one or more processors, when displaying the content being captured by the personal camera, are to:
display a set of virtual input elements along with the content; and
where the one or more processors, when receiving the indication to stream the content, are to:
receive the indication via at least one virtual input element of the set of virtual input elements.

8. A non-transitory computer-readable medium storing instructions, the instructions comprising:
one or more instructions that, when executed by one or more processors of a device, cause the one or more processors to:
provide, for display, content being captured by a personal camera associated with a user,
the device being wirelessly connected to the personal camera;
receive an indication to stream the content being captured by the personal camera;
determine, based on receiving the indication, configuration information associated with streaming the content,
the configuration information including information associated with a streaming application, and
the configuration information including information associated with notifying a viewer that the content is to be streamed;
provide, based on the information associated with notifying the viewer, a notification that the content is to be streamed,
the notification including information associated with the streaming application, and
the notification being provided for viewing by the viewer;
provide an indication that the device is prepared to receive voice input;
receive, based on providing the indication, the voice input from the user,
the voice input instructing the device to start streaming;
request a confirmation of the voice input instructing the device to start streaming;
initiate a timer based on requesting the confirmation;
detect that the timer expired; and
stream, based on detecting that the timer expired, the content via the streaming application,
the content being streamed to allow the viewer to access the content in real-time or near real-time relative to capturing of the content by the personal camera.

9. The non-transitory computer-readable medium of claim 8, where the one or more instructions, while causing the one or more processors to provide, for display, the content being captured by the personal camera, cause the one or more processors to:
cause the personal camera to record the content being captured by the personal camera; and
where the one or more instructions, that cause the one or more processors to receive the indication to stream the content being captured by the personal camera, cause the one or more processors to:
receive the indication after causing the personal camera to record the content being captured by the personal camera.

10. The non-transitory computer-readable medium of claim 8, where the one or more instructions, when executed by the one or more processors, further cause the one or more processors to:
pair with the personal camera; and
where the one or more instructions, that cause the one or more processors to determine the configuration information, cause the one or more processors to:
determine the configuration information based on pairing with the personal camera.

11. The non-transitory computer-readable medium of claim 8, where the one or more instructions, when executed by the one or more processors, further cause the one or more processors to:
provide, for display, a user interface associated selecting the streaming application,
the user interface including information associated with multiple streaming applications;
receive, via the user interface, a user selection of the streaming application,
the streaming application being one of the multiple streaming applications; and
where the one or more instructions, that cause the one or more processors to determine the configuration information associated with the streaming application, cause the one or more processors to:
determine the configuration information based on the user selection of the streaming application.

12. The non-transitory computer-readable medium of claim 8, where the one or more instructions, when executed by the one or more processors, further cause the one or more processors to:
provide, for display, a user interface associated with identifying a social media application associated with the user,
the user interface including information associated with multiple social media applications;
receive, via the user interface and based on user input, information that identifies at least one social media application of the multiple social media applications; and
where the one or more instructions, that cause the one or more processors to determine the configuration information associated with notifying the viewer, cause the one or more processors to:

determine the configuration information based on the user input that identifies the at least one social media application.

13. The non-transitory computer-readable medium of claim 8, where the one or more instructions, while causing the one or more processors, to stream the content via the streaming application, cause the one or more processors to:
cause, based on user input, the personal camera to capture an image; and
provide, for display, an indication that the personal camera has captured the image.

14. The non-transitory computer-readable medium of claim 8, where the one or more instructions, when executed by the one or more processors, further cause the one or more processors to:
receive an indication associated with controlling the personal camera,
the indication being based on a user interaction and being associated with at least one of:
causing the personal camera to start recording the content,
causing the personal camera to stop recording the content,
causing the personal camera to power-on, or
causing the personal camera to power-off; and
control the personal camera based on the indication.

15. A method, comprising:
receiving, by a companion device, content being captured by a personal camera,
the companion device being different than the personal camera, and
the companion device being wirelessly connected to the personal camera;
receiving, by the companion device, an indication to stream the content;
determining, by the companion device and based on receiving the indication, configuration information associated with streaming the content,
the configuration information identifying a streaming application via which the content is to be streamed, and
the configuration information identifying a social media application;
providing, by the companion device and via the identified social media application, a notification associated with streaming the content via the streaming application,
the notification being provided to notify a viewer, associated with the social media application, that the content is to be streamed via the streaming application, and
the notification including information that allows the viewer to access the streaming application to view the content;
providing, by the companion device, an indication that the companion device is prepared to receive voice input;
receiving, by the companion device and based on providing the indication, the voice input from the viewer,
the voice input instructing the companion device to start streaming;
requesting, by the companion device, a confirmation of the voice input instructing the companion device to start streaming;

initiating, by the companion device, a timer based on requesting the confirmation;
detecting, by the companion device, that the timer expired; and
streaming, by the companion device and based on detecting that the timer expired, the content via the identified streaming application,
the content being streamed such that the viewer is able access the content, streamed via the identified streaming application, in real-time or near real-time relative to capturing of the content.

16. The method of claim 15, further comprising:
causing the personal camera to record the content being captured by the personal camera; and
where receiving the indication to stream the content comprises:
receiving the indication after causing the personal camera to record the content being captured by the personal camera.

17. The method of claim 15, further comprising:
pairing with the personal camera; and
where determining the configuration information comprises:
determining the configuration information based on pairing with the personal camera.

18. The method of claim 15, further comprising:
displaying a user interface associated with identifying the streaming application,
the user interface including information associated with multiple streaming applications;
receiving, via the user interface and based on user input, the configuration information identifying the streaming application,
the streaming application being one of the multiple streaming applications; and
where determining the configuration information identifying the streaming application comprises:
determining the configuration information identifying the streaming application based on the user input via the user interface.

19. The method of claim 15, further comprising:
displaying a user interface associated with identifying the social media application,
the user interface including information associated with multiple social media applications;
receiving, via the user interface and based on user input, the configuration information identifying the social media application,
the social media application being one of the multiple social media applications; and
where determining the configuration information identifying the social media application comprises:
determining the configuration information identifying the social media application based on the user input via the user interface.

20. The method of claim 15, further comprising:
causing, based on receiving user input and while streaming the content, the personal camera to capture an image.

* * * * *